(12) United States Patent
Bloemenkamp et al.

(10) Patent No.: US 9,841,525 B2
(45) Date of Patent: *Dec. 12, 2017

(54) SYSTEM AND METHOD FOR MEASURING DOWNHOLE PARAMETERS

(75) Inventors: Richard Bloemenkamp, Issy-les-Moulineaux (FR); Andrew J. Hayman, Voisins-le-Bretonneux (FR); Gregoire Jacob, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 248 days.

This patent is subject to a terminal disclaimer.

(21) Appl. No.: 13/995,500

(22) PCT Filed: Dec. 7, 2011

(86) PCT No.: PCT/IB2011/055532
§ 371 (c)(1),
(2), (4) Date: Jul. 17, 2013

(87) PCT Pub. No.: WO2012/085726
PCT Pub. Date: Jun. 28, 2012

(65) Prior Publication Data
US 2013/0293234 A1  Nov. 7, 2013

(30) Foreign Application Priority Data

Dec. 20, 2010 (EP) .................................. 10195925
May 11, 2011 (EP) .................................. 11165709

(51) Int. Cl.
*G01V 3/00* (2006.01)
*G01V 3/20* (2006.01)
(Continued)

(52) U.S. Cl.
CPC .................. *G01V 3/20* (2013.01); *G01V 3/00* (2013.01); *G01V 3/24* (2013.01); *G01V 3/26* (2013.01); *G01V 3/265* (2013.01)

(58) Field of Classification Search
CPC ............... G01V 3/20; G01V 3/00; G01V 3/26
(Continued)

(56) References Cited

U.S. PATENT DOCUMENTS 3,816,811 A   6/1974  Cmelik K.
3,879,644 A   4/1975  Maltby
(Continued)

FOREIGN PATENT DOCUMENTS

EP   0426563 B1   8/1991
EP   2477047      11/2013
(Continued)

OTHER PUBLICATIONS

Office action for the equivalent Mexican patent application No. MX/a/2013/006794 issued on Apr. 16, 2014.
(Continued)

*Primary Examiner* — Reena Aurora
(74) *Attorney, Agent, or Firm* — Michael Dae

(57) ABSTRACT

Systems, tools and techniques for measuring downhole parameters are provided. The techniques involve providing a downhole tool with a sensing apparatus. The sensing apparatus has at least one source positionable about the downhole tool, at least one sensor electrode positionable about a front face of the downhole tool for measuring electrical signals from the source, and a raised insulating cover positionable along the front face of the downhole tool for defining at least one contact surface. The raised insulating cover extends over at least a portion of the sensor electrode whereby the sensor electrode is positionable adja-
(Continued)

cent to the subterranean formation for electrically coupling thereto without direct contact therewith.

15 Claims, 18 Drawing Sheets

(51) Int. Cl.
*G01V 3/26* (2006.01)
*G01V 3/24* (2006.01)

(58) Field of Classification Search
USPC .......................................... 324/338, 367, 374
See application file for complete search history.

(56) References Cited

U.S. PATENT DOCUMENTS

| | | | |
|---|---|---|---|
| 4,511,842 | A | 4/1985 | Moran et al. |
| 4,567,759 | A | 2/1986 | Ekstrom et al. |
| 4,608,983 | A | 9/1986 | Muller et al. |
| 4,857,852 | A * | 8/1989 | Kleinberg et al. ............ 324/339 |
| 5,191,290 | A | 3/1993 | Gianzero et al. |
| 5,457,396 | A | 10/1995 | Mori et al. |
| 5,467,759 | A | 11/1995 | Troncoso |
| 5,574,371 | A | 11/1996 | Tabanou et al. |
| 5,677,631 | A | 10/1997 | Reittinger et al. |
| 6,191,588 | B1 | 2/2001 | Chen |
| 6,527,923 | B2 | 3/2003 | Kirk et al. |
| 6,801,039 | B2 | 10/2004 | Fabris et al. |
| 6,891,377 | B2 | 5/2005 | Cheung et al. |
| 6,919,724 | B2 | 7/2005 | Cheung et al. |
| 7,066,282 | B2 | 6/2006 | Chen et al. |
| 7,119,544 | B2 | 10/2006 | Hayman et al. |
| 7,242,194 | B2 | 7/2007 | Hayman et al. |
| 7,258,005 | B2 | 8/2007 | Nyce |
| 7,382,136 | B2 | 6/2008 | Hayman |
| 7,407,566 | B2 | 8/2008 | Jiang et al. |
| 2003/0164705 | A1 | 4/2003 | Cheung et al. |
| 2005/0006090 | A1* | 1/2005 | Chemali et al. ......... 166/250.01 |
| 2007/0057674 | A1 | 3/2007 | Chen et al. |
| 2008/0288171 | A1 | 11/2008 | Itskovich et al. |
| 2009/0072833 | A1 | 3/2009 | Tabarovsky |
| 2009/0090176 | A1 | 4/2009 | Toribio et al. |
| 2009/0153155 | A1 | 6/2009 | Chambon et al. |
| 2009/0204346 | A1 | 8/2009 | Xie |
| 2010/0097067 | A1 | 4/2010 | Synder, Jr. et al. |
| 2010/0259416 | A1 | 10/2010 | Levy |
| 2013/0293235 | A1* | 11/2013 | Bloemenkamp ......... G01V 3/24 324/356 |

FOREIGN PATENT DOCUMENTS

| | | |
|---|---|---|
| WO | 01/77710 A1 | 10/2001 |
| WO | 2008/143616 A1 | 11/2008 |

OTHER PUBLICATIONS

EP Extended search Report issued in the related EP Application 10195925.2, dated May 17, 2011 (6 pages).
EP Communication Article 94-3 issued in the related EP Application 10195925.2, dated Jun. 3, 2013 (4 pages).
EP Communication Article 94-3 issued in the related EP Application 10195925.2, dated Sep. 24, 2013 (3 pages).
Office action issued in the related MX Application MX/a/2013/007041, dated Mar. 14, 2014 (5 pages).
International Search Report and Written Opinion issued in the related PCT Application PCT/IB2011/55521, dated Apr. 18, 2012 (7 pages).
International preliminary Report on patentability issued in the related PCT Application PCT/IB2011/55521, dated Jun. 25, 2013 (5 pages).
EP Extended search Report issued in the related EP Application 11165709.4, dated Sep. 21, 2011 (7 pages).
International Search Report and Written Opinion issued in the related PCT Application PCT/IB2011/55532, dated Apr. 16, 2012 (7 pages).
International preliminary Report on patentability issued in the related PCT Application PCT/IB2011/55532, dated Jun. 25, 2013 (5 pages).

* cited by examiner

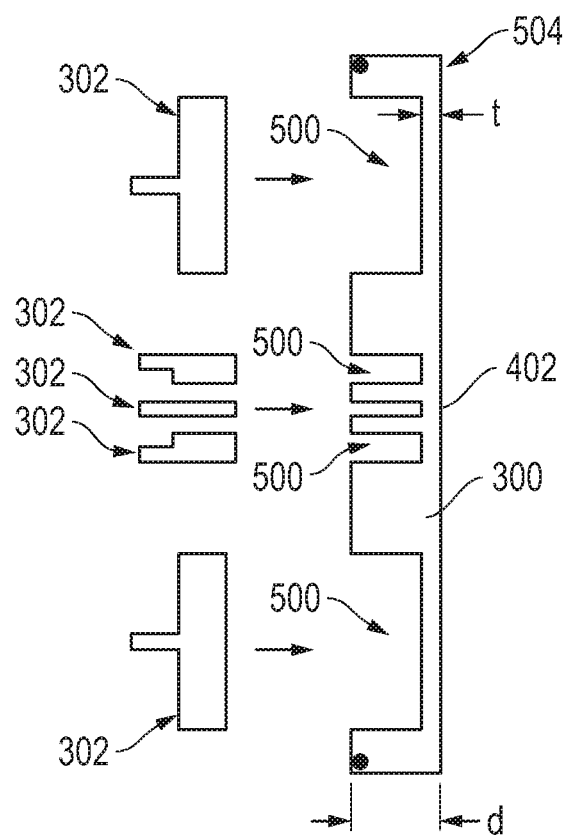
FIG. 5
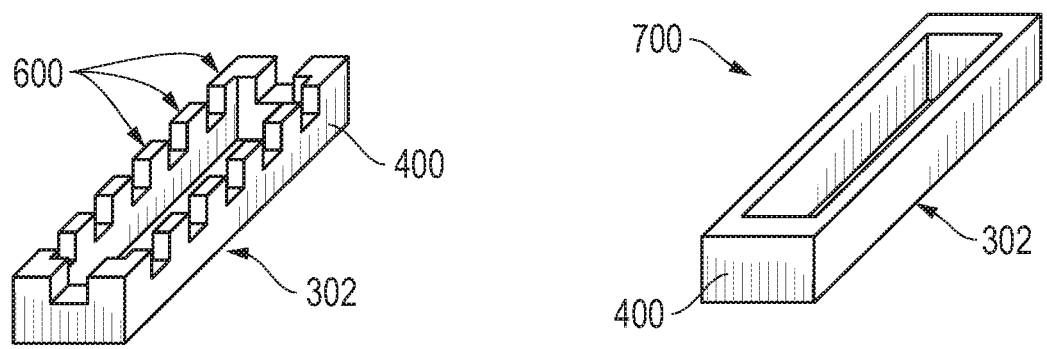
FIG. 6
FIG. 7

SYSTEM AND METHOD FOR MEASURING DOWNHOLE PARAMETERS

BACKGROUND OF THE INVENTION

1. Field of the Invention

The present invention relates to techniques for performing wellbore operations. More particularly, the present invention relates to techniques for determining downhole characteristics, such as electrical parameters of downhole fluids and/or subterranean formations.

2. Background of the Related Art

Oil rigs are positioned at wellsites for performing a variety of oilfield operations, such as drilling a wellbore, performing downhole testing and producing located hydrocarbons. Downhole drilling tools are advanced into the earth from a surface rig to form a wellbore. Drilling muds are often pumped into the wellbore as the drilling tool advances into the earth. The drilling muds may be used, for example, to remove cuttings, to cool a drill bit at the end of the drilling tool and/or to provide a protective lining along a wall of the wellbore (or borehole). During or after drilling, casing is typically cemented into place to line at least a portion of the wellbore. Once the wellbore is formed, production tools may be positioned about the wellbore to draw fluids to the surface.

During drilling, measurements are often taken to determine downhole conditions. In some cases, the drilling tool may be removed so that a wireline testing tool may be lowered into the wellbore to take additional measurements and/or to sample downhole fluids. Once the drilling operation is complete, production equipment may be lowered into the wellbore to assist in drawing the hydrocarbons from a subsurface reservoir to the surface.

The downhole measurements taken by the drilling, testing, production and/or other wellsite tools may be used to determine downhole conditions and/or to assist in locating subsurface reservoirs containing valuable hydrocarbons. Such wellsite tools may be used to measure downhole parameters, such as temperature, pressure, viscosity, resistivity, etc. Such measurements may be useful in directing the oilfield operations and/or for analyzing downhole conditions.

Various techniques have been developed for measuring downhole parameters as described, for example, in U.S. Pat. Nos. 6,801,039, 6,191,588, 6,919,724, 7,066,282, 6,891,377, 5,677,631, 5,574,371, 4,567,759, and 3,816,811. In some cases, techniques have been generated for determining parameters of the formations surrounding the borehole. For example, micro-resistivity measurements of borehole walls may be taken to generate images of formations surrounding the borehole. Such micro-resistivity measurements may be taken using downhole tools, such as a Fullbore Micro Imager (FMI™) of SCHLUMBERGER™ and an Earth Imager™ of BAKER ATLAS™. In one example, measurements may be taken using current injection when the borehole is filled with a conductive fluid or mud. Where a non-conductive fluid is present, such as oil-based mud (OBM) with a very high resistivity compared to that of the formation such that a thin layer of mud between a measurement electrode and the formation, high impedance is generated between the electrode and the formation. Another example mounts one or more button voltage electrodes on an insulating pad, such as is used in the Oil Base Micro Imager tool (OBMI™) of SCHLUMBERGER™.

Stability problems may sometimes occur in cases where a measurement electrode touches the formation, or if the mud has conductive bubbles in it which form a low-impedance electrical connection between the measurement electrode and the formation. High impedance between the electrode and the formation can suddenly reduce to very small impedance or vice versa, which may lead to a change in the measurement that is not due to a change in formation parameters. For example a small change from 0.10 mm to 0.00 mm mud thickness can lead to a significant change in impedance. In general, both the magnitude and the phase of the impedance can change drastically.

It may be desirable in some cases to provide a minimum distance or stand-off between a measurement pad and the borehole wall. Attempts have been made to provide protruding elements, for example protruding wear plates, on the sensor pad to touch the formation and keep the pad's front face away from the formation. However, existing protruding devices may be subject to damage in downhole conditions, may still have problems with measurements where conductive bubbles are present in the mud, and may be subject to large standoff variations during the logging process.

The invention contained herein is provided to address deficiencies with existing techniques.

SUMMARY OF THE DISCLOSURE

In at least one aspect, the invention relates to a sensing apparatus for measuring downhole parameters of a wellsite, the wellsite having a downhole tool positionable in a wellbore extending into a subterranean formation. The sensing apparatus includes at least one source positionable about the downhole tool, at least one sensor electrode positionable about a front face of the downhole tool for measuring electrical signals from the source, and a raised insulating cover positionable along the front face of the downhole tool for defining at least one surface thereon to be in contact with a borehole wall. The raised insulating cover extends over at least a portion of the sensor electrode whereby the sensor electrode is positionable adjacent to the subterranean formation for electrically coupling thereto without direct contact therewith.

The sensing apparatus may also include a base positionable in the downhole tool for supporting the sensing electrode and the raised insulating cover thereon, an insulating layer positionable about at least a portion of the sensor electrode (the raised insulating portion supported by the insulating layer), at least one seal between the raised insulating cover and the insulating layer, and/or a conductive layer positionable about at least a portion of the electrode in non-contact therewith (the raised insulating portion supported by the conductive layer). At least a portion of the insulating layer may be positioned between at least a portion of the at least one sensor electrode and the raised insulating cover. The insulating layer may be integral with the raised insulating cover. The insulating layer may have at least one cavity for receiving the source. The insulating layer may have at least one hole for receiving the sensor electrode.

The source may be a source electrode positionable about the downhole tool a distance from the sensing electrode for electrical communication therewith, or positioned in a mandrel of the downhole tool. A source electrode portion of the raised insulating cover may extend over at least a portion of the source. The raised insulating cover may have an outer surface for covering the sensor electrode. The raised insulating cover may have a sidewall extending over at least a portion of a sidewall of the sensor electrode. The raised insulating cover may have a lip on an outer perimeter thereof. The sensor electrode may include at least one guard electrode and/or at least one button electrode.

The sensing apparatus may also include at least one wear plate. The raised insulating cover may extend over the at least one wear plate. The raised insulating cover may have a mud scraper thereon. The raised insulating cover may provide a standoff between a wall of the wellbore and the sensor electrode. The portion of the raised insulating cover that may face a borehole may have a thickness of about 0.30 to 3.00 mm. The sensor electrode may be a metalized coating or a solid component. The at least one source may have an oval body surrounding the sensor electrode. The sensor electrode and the source may be configured to couple capacitively to the formation for measurement thereof. The raised insulating cover may be made of a ceramic material. Portions of the raised insulating cover may be made of different materials.

In another aspect, the invention may relate to a system for measuring downhole parameters of the wellsite. The wellsite has a wellbore extending into a subterranean formation. The system includes a downhole tool deployable from a rig into the wellbore, and at least one sensing apparatus positionable about the downhole tool. The sensing apparatus includes at least one source positionable about the downhole tool, at least one sensor electrode positionable about a front face of the downhole tool for measuring electrical signals from the source, and a raised insulating cover positionable along the front face of the downhole tool for defining at least one contact surface thereon. The raised insulating cover extends over at least a portion of the sensor electrode whereby the electrode is positionable adjacent to the subterranean formation for electrically coupling thereto without direct contact therewith.

The source may include at least one source electrode positioned on the downhole tool, or a mandrel of the downhole tool. The downhole tool may be a logging, wireline, drilling, coiled tubing, drill stem tester, production, casing, pipe and/or completions tool. The system may also include a base for supporting the sensing apparatus, the base extendable from the downhole tool via an arm.

In another aspect, the invention may also relate to a method for measuring downhole parameters of a wellsite. The method may involve providing a downhole tool with a sensing apparatus, deploying the downhole tool into the wellbore, positioning the at least one contact surface of the raised insulating cover adjacent the wall of the wellbore such that the one sensor electrode is positionable adjacent to the subterranean formation for electrically coupling thereto without direct contact therewith; passing an electronic signal through the subterranean formation via the source; and measuring at least one downhole parameter of the formation from the electronic signal.

The step of passing may involve passing the electronic signal from the source to the sensor electrode. The step of passing may involve passing the electronic signal through the raised insulating cover. The sensing apparatus may include an insulating layer and the step of passing may involve passing the electronic signal through the insulating layer.

In yet another aspect, the invention may relate to a method for measuring downhole parameters of the wellsite. The method may involve providing a downhole tool with the sensor pad, deploying the downhole tool into the wellbore, positioning the contact surface of the raised insulating cover adjacent a wall of the wellbore such that the electrodes are positionable adjacent to subterranean formation for electrically coupling thereto without direct contact therewith, passing an electronic signal through the subterranean formation via the electrodes, and measuring at least one downhole parameter of the formation from the electronic signal. The method may also involve passing an electronic signal from the source electrode to the sensor electrode, passing the electronic signal through the raised insulating cover, and passing the electronic signal through the insulating layer.

Other aspects of the invention relate to a sensor pad for measuring electrical properties of an underground formation surrounding a borehole. The system preferably comprises a downhole tool positionable in the borehole, a tool pad positionable on the downhole tool, and a plurality of electrodes mounted on the tool pad and configured to face a wall of the borehole. The sensor pad further comprises an insulating layer extending over at least a portion of the electrodes facing the wall of the borehole.

The plurality of electrodes of the sensor pad may be configured to couple capacitively to the formation to measure its electrical properties. Moreover, the electrodes may be mounted in a blind hole formed in the sensor pad. The electrodes may comprise at least one button electrode and at least one return electrode with an optional source electrode and/or a guard electrode. As an example, the at least one button electrode may be less than two centimeters in diameter. The electrodes may comprise a series of interconnected spaced sub-electrodes configured to operate as a single electrode.

Further, a wear plate may be provided for maintaining a minimum standoff between the sensor pad and the wall of the borehole. Even further, the insulating layer may be formed by depositing an insulating material over at least a portion of the electrodes, or by modifying the surface properties of the electrodes to become insulating. The insulating layer may comprise a face of the sensor pad formed from an insulating material. Where the electrodes comprises at least one button electrode and at least one return electrode, the insulating layer may extend over a substantial portion of the at least one button electrode facing the wall of the borehole. Where the electrodes comprise a series of interconnected spaced sub-electrodes configured to operate as a single electrode, the insulating material may extend between the series of interconnected spaced sub-electrodes. The insulating material may have different thicknesses depending on the nature of the sub-electrode. As an example, the insulating layer may have a thickness of not more about than 3.00 mm in front of the electrode(s) or portion(s) of electrode(s).

The invention may also relate to the sensor pad for measuring electrical properties of an underground formation as described herein, wherein the downhole tool is either a wireline tool and/or a logging while drilling tool. As an example, the downhole tool may include various selected components from the group including a mandrel, a standoff keeper, a fin, a skid, and a stabilizer.

The invention may also relate to a method for measuring the electrical properties of an underground formation surrounding a borehole. The method preferably comprises the steps of positioning a downhole tool with a sensor pad thereon in the borehole, the sensor pad having insulation thereon; positioning the sensor pad in the borehole adjacent a wall of the borehole, the sensor pad having a plurality of electrodes for measuring the electrical properties of the formation mounted in the insulation on the sensor pad and configured to face the wall of the borehole, and having an insulating layer extending over at least a portion of the electrodes facing the wall of the borehole; and configuring at least one of the electrodes to measure the electrical properties of the formation through the insulating layer.

The method may further comprise the step of configuring at least one of the electrodes to couple capacitively to the formation to measure the electrical properties of the formation. In addition, the method may further comprise using the sensor pad for measuring electrical properties of an underground formation as described herein.

These together with other aspects, features, and advantages of the present disclosure, along with the various features of novelty, which characterize the invention, are pointed out with particularity in the claims annexed to and forming a part of this disclosure. The above aspects and advantages are neither exhaustive nor individually or jointly critical to the spirit or practice of the disclosure. Other aspects, features, and advantages of the present disclosure will become readily apparent to those skilled in the art from the following detailed description in combination with the accompanying drawing. Accordingly, the drawings and description are to be regarded as illustrative in nature, and not restrictive.

BRIEF DESCRIPTION OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

FIG. 1A depicts a drilling downhole tool. FIG. 1B depicts a wireline downhole tool.

FIG. 5 is an exploded cross-sectional view of a portion of the sensor pad of FIG. 3.

FIG. 6 is a perspective view of a multi guard electrode.

FIG. 7 is a perspective view of a ring guard electrode.

DETAILED DESCRIPTION

The description that follows includes exemplary sensor pad, methods, techniques, and instruction sequences that embody techniques of the present inventive subject matter. However, it is understood that the described embodiments may be practiced without these specific details. Presently preferred embodiments of the disclosure are shown in the above-identified Figures and described in detail below.

The invention relates to techniques for measuring downhole parameters. A downhole tool with a sensor pad is configured to minimize a distance between the sensor electrode and a wall of the wellbore, eliminate direct contact with the formation and/or highly conductive bubbles in the mud, and to protect components thereof. This configuration may also be used to provide accuracy of measurement, optimized measurement processes, reduced clogging, minimized components, reduced size, increased surface area for measurement, constant flow of fluids during measurement, optimized shape of measurement sensor pad/system, compatibility with existing wellsite equipment, operability in downhole conditions (e.g., at high temperatures and/or pressures), etc.

Figure 1A:
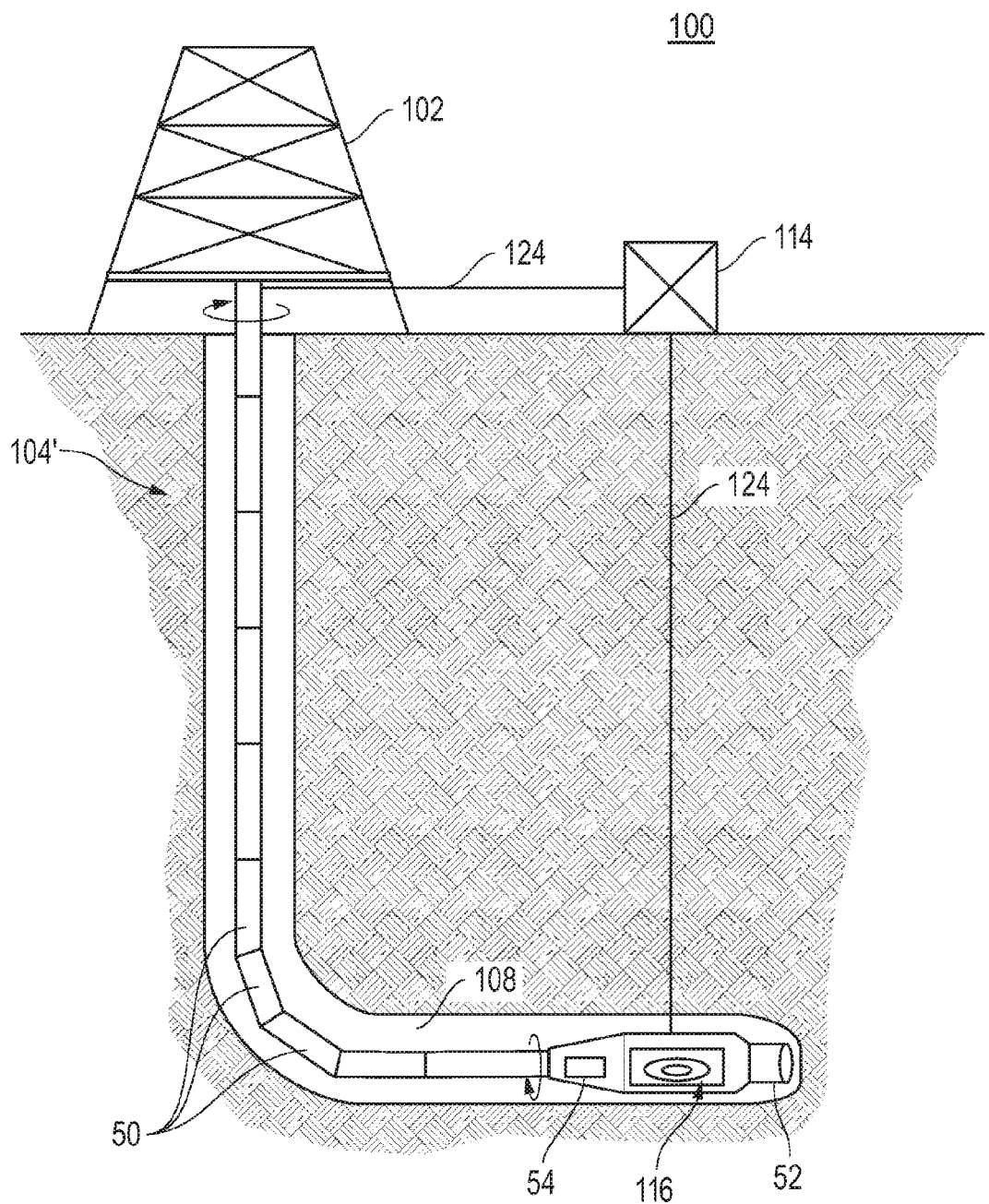
FIGS. 1A and 1B are schematic views of a wellsite having a cased wellbore and a system for measuring downhole parameters therein.
Figure 1B:
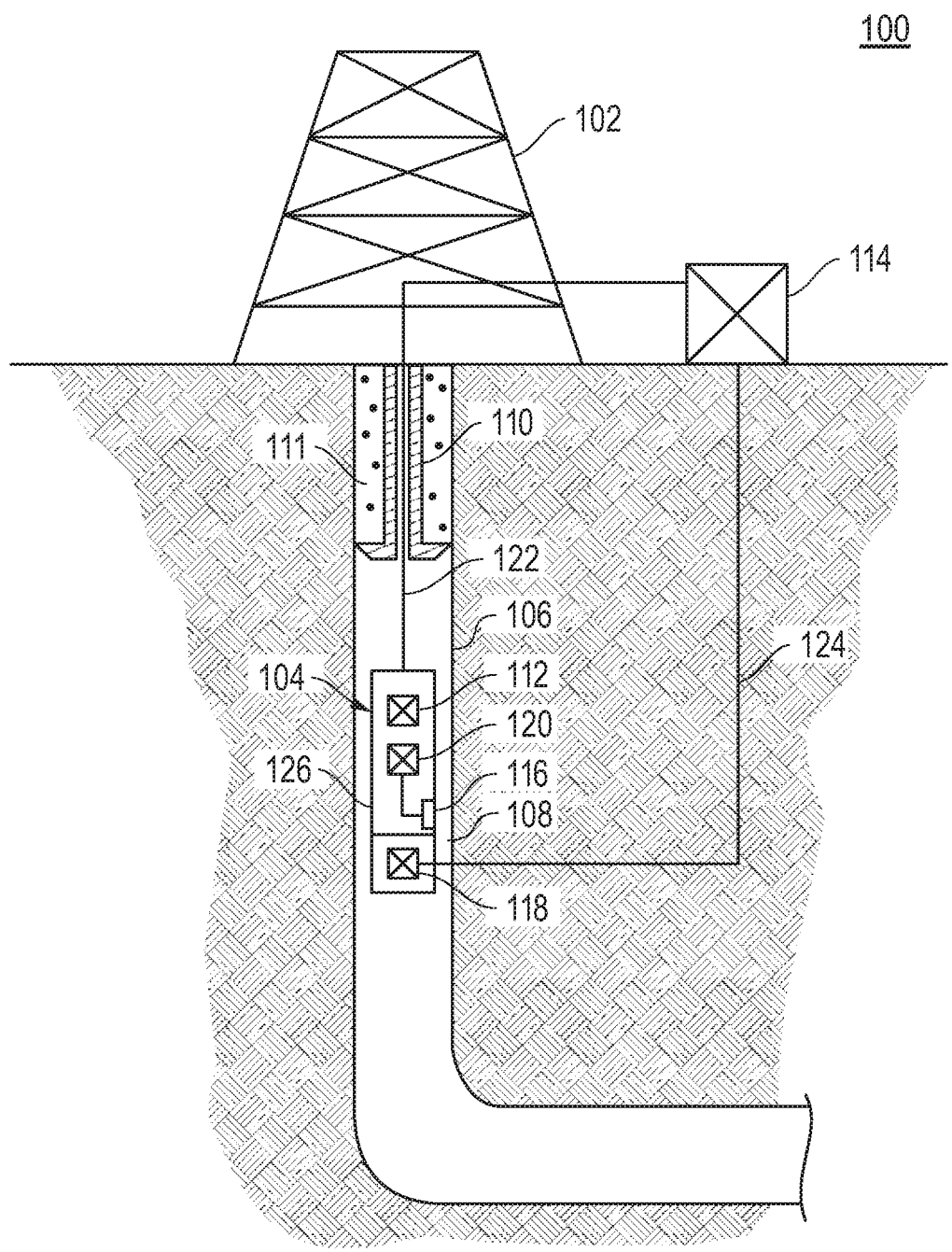

FIGS. 1A and 1B are schematic views of a wellsite 100 having an oil rig 102 with a downhole tools 104' and 104, respectively, suspended into a wellbore (or borehole) 106 therebelow. As shown in FIG. 1A, the downhole tool 104' is a conventional drilling tool. The wellbore 106 has been drilled by the drilling downhole tool. The drilling tool 104' includes a plurality of drill pipe 50 with a drill bit 52 at an end thereof. The drilling tool also has a conventional logging while drilling ("LWD") tool 54 which may be in communication with a surface unit 114 via communication link 124, and a sensor pad 116. A drilling mud, and/or a wellbore fluid 108, may have been pumped into the wellbore 106 and may line a wall thereof. Once drilling is complete, the drilling tool 104' may be removed, and a casing 110 may also be positioned in a portion of the wellbore 106 and cemented into place therein by a cement 111 as shown in FIG. 1B.

As also shown in FIG. 1B, the downhole tool 104 is shown as a wireline logging tool lowered into the wellbore 106 to take various measurements. The downhole tool 104 may be inserted into the well before or after placement of the casing 110 into the wellbore. The downhole tool 104 may include a conventional logging device 112, a sensor pad 116, one or more telemetry devices 118, and an electronics package 120.

The conventional logging device 112 may be provided with various sensors, measurement devices, communication devices, sampling devices and/or other devices for performing wellbore operations. The downhole tool 104 may include one or more sensors for determining one or more downhole parameters, such as wellbore fluid parameters, wellbore integrity parameters and/or formation parameters. For example, as the downhole tool 104 is lowered, the logging device 112 may use devices, such as resistivity or other logging devices, to measure downhole parameters and/or properties.

As shown, the downhole tool 104 may be conveyed into the wellbore 106 on a wireline 122. Although the downhole tool 104 is shown as being conveyed into the wellbore 106 on a wireline 122, it should be appreciated that any suitable conveyance may be used, such as a slick line, a coiled tubing, a drill string, a casing string, a logging tool and the like. The downhole tool 104 may be operatively connected to the surface unit 114 for communication therebetween. The downhole tool 104 may be wired via the wireline 122, as shown, and/or wirelessly linked via the one or more telemetry devices 118. The one or more telemetry devices 118 may include any telemetry devices, such as electromagnetic devices, for passing signals to a surface unit 114 as indicated by communication link 124. Further, it should be appreciated that any communication device or system may be used to communicate between the downhole tool 104 and the surface unit 114. Signals may be passed between the downhole tool 104 and the surface unit 114 and/or other locations for communication therebetween. Data may be passed to the surface by the communication link 124, and/or stored inside the downhole tool 104 for download upon retrieval to the surface.

While the downhole tool 104 is depicted as the wireline tool 104 having the sensor pad 116 thereon, it will be appreciated that the sensor pad 116 may be positioned downhole on a variety of one or more tools. For example, the sensor pad 116 may be placed downhole on a variety of downhole tools, such as a drilling, coiled tubing, drill stem tester, production, casing, pipe, completions, or other downhole tool. Although only one sensor pad 116 is shown, it should be appreciated that one or more sensor pads 116 and/or portions of the sensor pads 116 may be located at several locations in the wellbore 106.

The sensor pad 116 is a sensing component located on the downhole tool 104 and positionable adjacent a wall of the wellbore for measurement thereof. The sensor pad 116 is preferably positioned about an outer surface of the downhole tool 104 so that the downhole fluid and/or the formation may pass therealong for measurement thereof. However, it will be appreciated that the one or more sensors 116 may be positioned at various locations about the wellsite 100 as desired for performing fluid measurement. Further, the sensor pad(s) 116 may be located on the downhole tool 104 within a mandrel, a standoff keeper, a fin, a skid, a stabilizer and the like as will be described further herein.

The electronics package 120 may include any components and/or devices suitable for operating, monitoring, powering, calculating, calibrating, and analyzing components of the downhole tool 104. Thus, the electronics package 120 may include, for example, a power source, a processor, a storage device, a signal conversion (digitizer, mixer, amplifier, etc.), a signal switching device (switch, multiplexer, etc.), a receiver device and/or a transmission device, and the like (not shown). The electronics package 120 may be operatively coupled to the sensor pad 116. The power source in the electronics package 120 may apply a voltage to the sensor pad 116. The power source may be provided by a battery power supply or other conventional means of providing power. In some cases, the power source may be an existing power source used in the downhole tool 104. The power source may be positioned, for example, in the downhole tool 104 and wired to the sensor pad 116 for providing power thereto as shown. Optionally, the power source may be provided for use with the sensor pad 116 and/or other downhole devices. Although the electronics package 120 is shown as one separate unit from the sensor pad 116, it should be appreciated that any portion of the electronics package 120 may be included within the sensor pad 116. Further, the components of the electronics package 120 may be located at various locations about the downhole tool 104, the surface unit 114 and/or the wellsite 100. The sensor pad 116 may also be wired or wirelessly connected to any of the features of the downhole tool 104, and/or surface unit 114, such as communication links 124, processors, power sources or other features thereof.

The sensor pad 116 may be capable of determining one or more downhole parameters, such as one or more downhole fluid parameters and/or one or more formation parameters. The downhole fluids may include any downhole fluids such as downhole mud (e.g., oil and/or water based), hydrocarbons, water and/or other downhole fluids. The sensor pad 116 may determine the downhole parameters of the downhole fluids and/or the downhole formations as the downhole tool 104 passes through the wellbore 106. The sensor pad 116 may be positioned on the downhole tool 104 in such a manner that the sensor pad 116 is capable of measuring fluids and/or downhole formations as the downhole tool 104 passes through the wellbore 106 under the harsh conditions of the downhole environment. Further, the sensor pad 116 may be positioned in such a manner that reduces clogging of downhole fluids as the downhole fluids pass the sensor pad 116.

As shown, the sensor pad 116 is positioned on an outer surface 126 of the downhole tool 104. The sensor pad 116 may have an insulating layer covering one or more electrodes in the sensor pad 116 as will be described in more detail below. The sensor pad 116 may be flush with the outer surface 126 of the downhole tool 104. Further, the sensor pad 116 may be recessed a distance below the outer surface 126 to provide additional protection thereto, or protruded a distance therefrom to access fluid and/or formation. The sensor pad 116 may also be positioned at various angles and locations as desired.

Figure 2A:
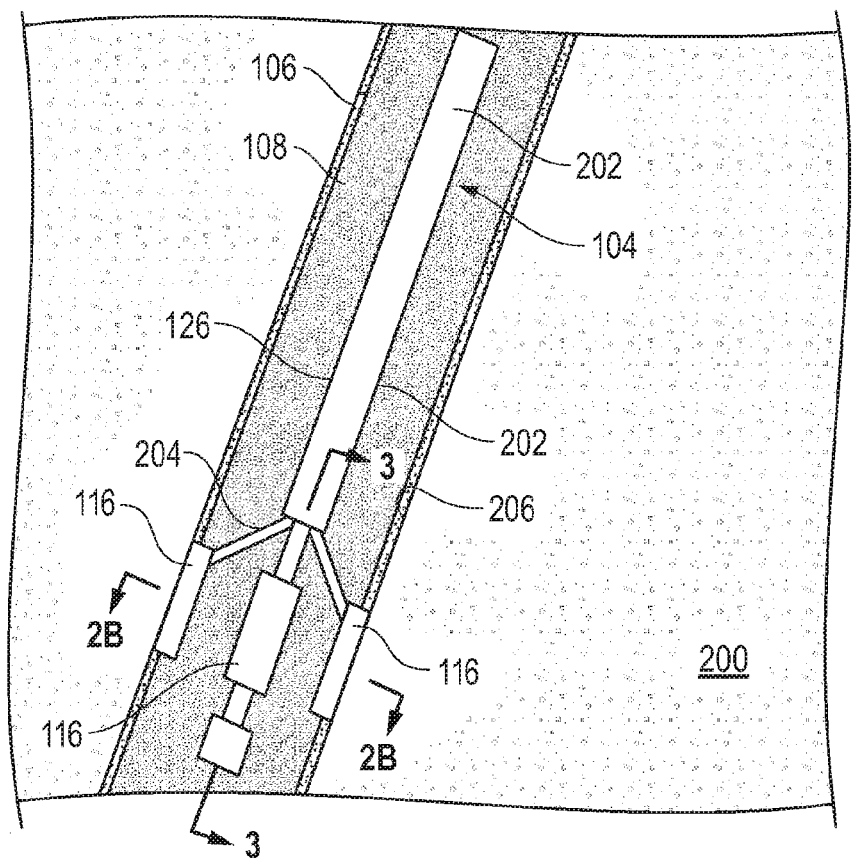
FIG. 2A is a schematic view of a portion of a downhole tool with a sensor pad thereon.
Figure 2B:
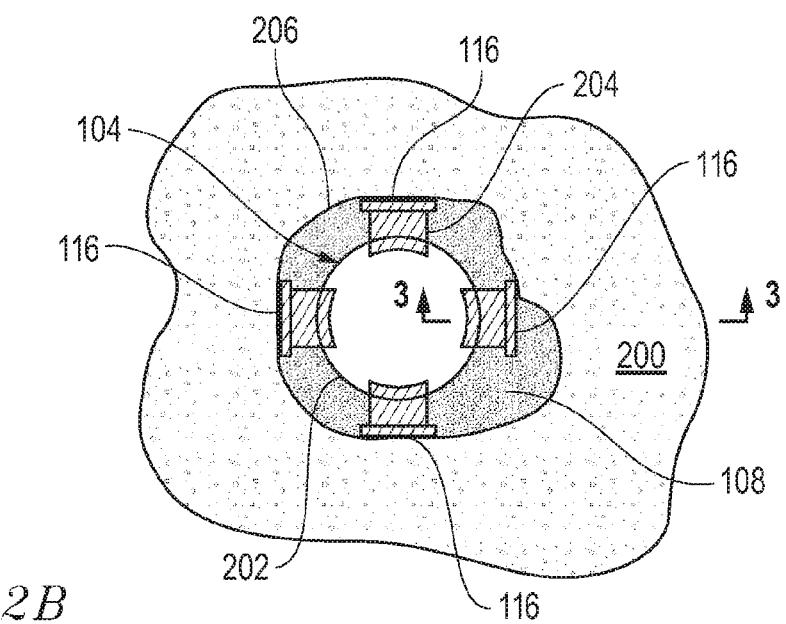
FIG. 2B is a cross-sectional view of the downhole tool of FIG. 2A taken along line 2B-2B.

FIG. 2A shows a schematic view of a downhole tool usable as the downhole tool 104 located in the wellbore 106 and within a downhole formation 200. As depicted, the downhole tool 104 is a wireline microresistivity tool containing the sensor pads 116. The sensor pads 116 may be located on the outer surface 126 (as shown in FIG. 1), or located on one or more arms 204 which extend from downhole tool 104 (as shown in FIGS. 2A and 2B). The arms 204 may be configured to place the sensor pads 116 as close to the formation wall 206, or against a mud layer 108 on the formation wall 206, as possible. Thus, the arms 204 may be actuatable, or spring loaded in order to bias the sensor pads 116 against the formation wall 206.

FIG. 2B shows a cross-sectional view of the downhole tool 104 in FIG. 2A taken along line 2B-2B. As shown, the downhole tool 104 may include one or more sensor pads 116 located around a tool mandrel 202. Each of the sensor pads 116 may be configured to measure the downhole parameters, such as the downhole fluid and/or parameters of the formation 200. While the sensor pads 116 of FIG. 2B are depicted as being flat, it will be appreciated that a front face of the sensor face may be rounded to conform to the wellbore wall 206.

Figure 3:
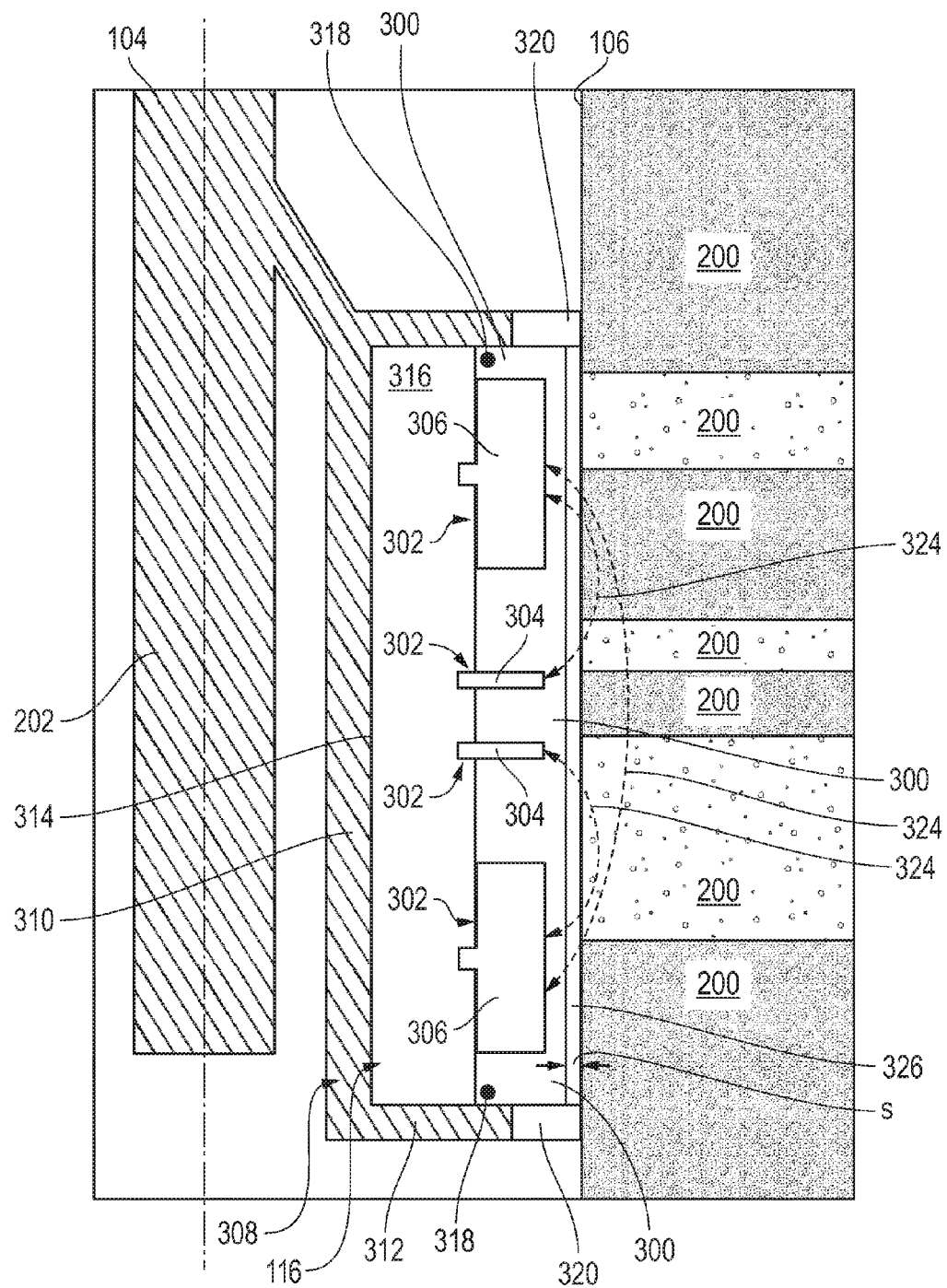
FIG. 3 is a cross-sectional view of a portion of the downhole tool of FIGS. 2A and 2B taken along line 3-3, depicting a sensor pad.

FIG. 3 shows a schematic view of a portion of the downhole tool 104 of FIG. 2A taken along line 3-3. This view shows the sensor pad 116 supported on the mandrel 202. The sensor pad 116 may be used for measuring electrical properties of the formation layers 200 in a hydrocarbon well, or wellbore 106. The sensor pad 116 may comprise an insulating layer 300, or insulating front face, covering an arrangement of electrodes 302. The electrodes 302 may comprise one or more button (or return electrodes) electrodes 304 and one or more source electrodes 306 (or return electrodes).

The electrodes 302 may be in the form of coatings or solid components. The electrodes 302 (e.g., the button electrodes 304, the source electrode 306, the guard electrode 400 as described herein) may be, for example, a coating metallized onto an insulator section (e.g., insulating layer 300) and/or solid components positioned in the insulator section. Each of the electrodes 302 may be held in place with conventional fixture mechanisms, such as screws, glue, epoxy, locking means, press-fitting, (over)-molding, plating (electrode, coin), coating or the like. The button electrodes 304 may have any suitable diameter. In one example, the button electrodes 304 are less than or equal to about 2.00 cm in diameter.

The insulating layer 300 may cover the entire front face of the sensor pad 116 thereby covering and sealing the electrodes 302. The insulating layer 300 may further extend down a portion of the sides of the sensor pad 116. The sensor pad 116 may be held by a tool pad 308. As shown in FIG. 3, the tool pad 308 may have a tool pad base (or base) 310 having one or more tool pad walls 312.

The sensor pad 116 may include a sensor pad base 316. The sensor pad base 316 may be configured to secure the electrodes 302 and the insulating layer 300 to the tool pad 308. A back face 314 of the sensor pad 116 and/or sensor pad base 316 may be located proximate and/or secured to the tool pad base 310. The sensor pad base 316 may adhere to the tool pad 308 using any conventional means.

As shown in FIG. 3, the sensor pad base 316 may extend partially along the one or more pad walls 312. A portion of the insulating layer 300 extending along the side of the sensor pad 116 may meet the sensor pad base 316 within the one or more pad walls 312. Because the insulating layer 300 completely covers the electrodes 302, only a perimeter between the insulating layer 300 and the sensor pad base 316 may need to be sealed in order to seal the electrodes 302 from wellbore fluids, as will be described in more detail below.

The insulating layer 300 and/or the sensor pad base 316 may be any suitable insulating material, such as PEEK (polyetheretherketone), capable of allowing electrical communication between components, such as the electrodes 302, of the sensor pad 116. Such electrical communication may be, for example, capacitive coupling between the electrodes 302. In some versions, the PEEK material may be a metal material capable of impeding and/or stopping current flow therethrough at selected frequencies as desired. For example, the PEEK material may prohibit current flow at lower frequencies, but allow current flow at higher frequencies. Although described as PEEK, it should be appreciated that the insulating layer 300 and/or the sensor pad base 316 may be any suitable material for impeding or stopping current including, but not limited to, Sapphire, ceramics, polyimide resin, plastic, and the like.

A seal 318, such as through a perimeter seal or O-ring, through adhesive bonding, through welding or brazing etc., may be used for sealing the sensor pad 116 from unwanted borehole fluids. The sensor pad 116 may also incorporate one or more wear plates 320. The one or more wear plates 320 may ensure some standoff S between the formation 200 and the electrodes 302. Further the one or more wear plates 320 may prevent the electrodes 302 and/or the insulating layer 300 from touching the formation 200, and/or being damaged or worn by the formation 200. The wear plates 320 may extend a distance beyond the face of the insulating layer 300 toward the formation 200 to protect the insulating layer 300 and/or the electrodes 302. Further, because the insulating layer 300 protects the electrodes 302, the wear plates 320 may be flush with an outer face of the insulating layer 300, and/or be slightly recessed from the outer face. The wear plates 320 may maintain a minimum standoff S between the insulating layer 300 of the sensor pad 116 and the formation wall 206. Wellbore fluid 326 (such as mud 108) may be present between the sensor pad 116 and the wall 206 of the wellbore.

The seal 318 may seal the electrodes 302 and any electronics of the sensor pad 116 from the borehole environment. The seal 318 may be accomplished using one perimeter seal between the sensor pad base 316, the insulating layer 300 and an interior of the one or more pad walls 312. Although, the seal 318 is shown as an O-ring, it may be any suitable device for sealing the interior of the sensor pad 116.

Figure 4:
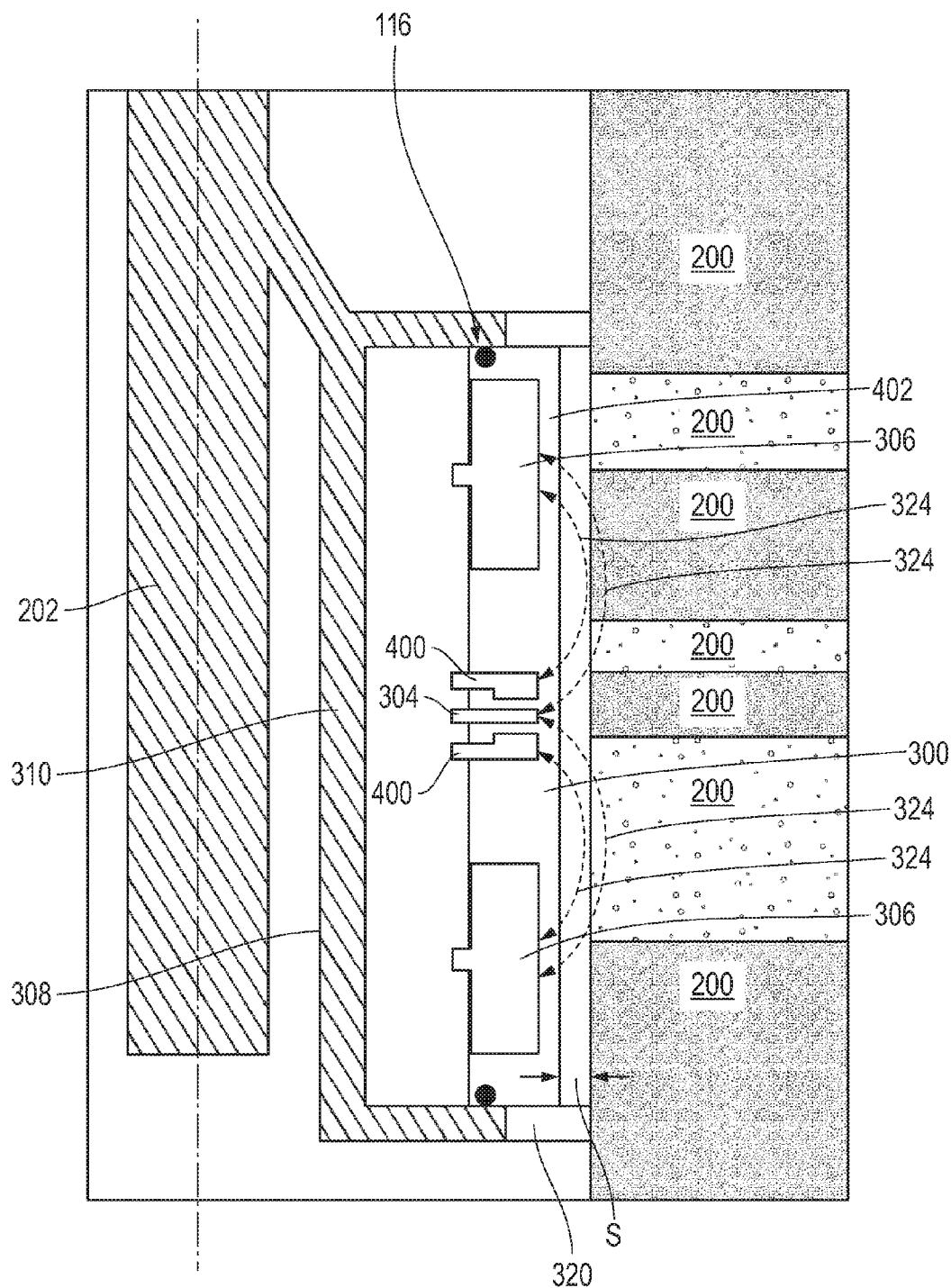
FIG. 4 is a cross-sectional view of the portion of the downhole tool of FIG. 3, depicting an alternate sensor pad.

FIGS. 3 and 4 show the sensor pad 116 having the insulating layer 300 on a front face 402 extending over all of the electrodes 302. FIG. 4 shows the sensor pad 116 of FIG. 3 having one or more guard electrodes 400 around a button electrode 304. The electrodes 302 may be secured to the insulating layer 300 in the manner described below. While at least a portion of the sensor pads 116 may have electrodes mounted into the front face 402, as shown in FIGS. 3 and 4, the insulating layer 300 (or the front face) may cover the electrodes 302. The electrodes 302 may optionally be completely covered with the insulating layer 300 to help eliminate the need for the individual electrode mounting to seal against borehole fluid entry.

The electrodes 302 may form a circuit which may include one or more of the source electrodes 306 (or returns) and the button electrodes 304 (or sensor electrode). Between the source electrodes 306 and the button electrodes 304 there may be an insulating material. As shown, the insulating material is part of the insulating layer 300. The electrodes 302 may be communicatively linked to the electronics package 120 (FIG. 1). The electrodes 302 may be arranged in a variety of configurations, and should not be limited to the configuration shown in the drawings, primarily depending on the parameters to be measured by the downhole tool 104.

The button electrodes 304 may be used to measure a voltage with respect to a ground, or another electrode 302, and/or may be used to measure a current 324 between at least one of the source electrodes 306 and the button electrodes 304 (or another source electrode 306). From the voltage and the current electrical properties, or parameters, measured via the button electrodes 304, various downhole parameters of, for example, the wellbore fluid and/or the formation may be determined. The electrical properties may include, for example, conductivity and permittivity. In certain applications, the button electrodes 304 may measure the amplitude and phase of the voltage and the current 324. From the amplitude and phase of the voltage and the current 324, the complex impedance may be calculated for the wellbore fluid and/or the formation. With the complex impedance known, various electrical properties may be calculated.

In another example, the button electrodes 304 may be used to measure the amplitude of the voltage and the current 324. From the amplitude of the voltage and the current 324, the impedance amplitude may be calculated. With the impedance amplitudes known electrical properties such as absolute conductivity and impedivity may be calculated. In another example, the button electrodes 304 may be used to measure the phase of the voltage and the current 324. From phase of the voltage and the current 324, the impedance phase may be calculated. With the impedance phase known, the ratio of conductivity and permittivity may be calculated. Measurements taken via the button electrodes 304 may be taken at several frequencies to optimize response.

The source (or return) electrode(s) 306, and possibly the button (or sensor) electrode(s) 304 may be any conventional electrode capable of generating a current 324 across the fluid 326 and/or formation 200 with measurable effects. A power source (e.g., included in the electronics package 120 of FIG. 1) may be operatively connected to the electrodes 302 for applying a voltage thereacross. As voltage is applied, the current 324 flows out of one of the electrodes 302, for example the source electrodes 306, and can be measured by the button electrodes 304. Current may be passed through the mud and/or formation for measurement thereof as shown.

The current 324 from the electrodes may be used to determine various parameters. In an example involving a fluid passing between a pair of electrodes, an AC voltage V may be applied between two electrodes to generate a resultant current I that can be measured at the sensor electrode, for example a mud button or a formation button electrode. The complex impedance Z may be determined from the measured current I based on the following:

$$Z=|Z|\exp(i\phi_z) \qquad \text{Equation (1)}$$

where a magnitude |Z| based on Ohms law and phase $\phi_z$ are defined as follows:

$$|Z|=|V/I| \qquad \text{Equation (2)}$$

$$\phi_z=\text{phase of } I \text{ relative to } V \qquad \text{Equation (3)}$$

and where exp $(i\phi_z)$ based on Euler's formula is define as follows:

$$\exp(i\phi_z)=\cos\phi_z+i\sin\phi_z \qquad \text{Equation (4)}$$

The magnitude and phase of the impedivity (sometimes referred to as the complex impedivity) of a fluid $\zeta$ is defined as follows:

$$\zeta=|\zeta|\exp(i\phi_\zeta) \qquad \text{Equation (5)}$$

Equation (5) may be derived from Z by the relations as follows:

$$|\zeta|=k|Z| \qquad \text{Equation (6)}$$

Equation (6) may also be written follows:

$$|\zeta|=k|V|/|I| \qquad \text{Equation (7)}$$

The phase (or dielectric angle) of the fluid $\zeta$ is derived as follows:

$$\phi_\zeta=\phi_z \qquad \text{Equation (8)}$$

where:
|$\zeta$| is the magnitude of the impedivity,
$\phi_\zeta$ the phase angle of the impedivity, and
k is a constant for the device.

The constant k may be measured empirically, for example, by measuring the impedance V/I between electrodes as a fluid of known impedivity is passed therethrough. The constant k also be calculated from the geometry of the electrodes using conventional methods.

Data concerning the measured current may be used to determine fluid or other downhole parameters, such as impedivity, resistivity, impedance, conductivity, complex conductivity, complex permittivity, tangent delta, and combinations thereof, as well as other parameters of the wellbore fluid. The data may be analyzed to determine characteristics of the wellbore fluid, such as the type of fluid (e.g., hydrocarbon, mud, contaminants, etc.) A processor (e.g., located in the logging device 112, the electronics package 120 of FIG. 1) may be used to analyze the data. Optionally, the data may be communicated to the surface unit 114 and/or other location for storage and/or analysis. Such analysis may be performed with other inputs, such as historical or measured data about this or other wellsites. Reports and/or other outputs may be generated from the data. The data may be used to make decisions and/or adjust operations at the wellsite. In some cases, the data may be fed back to the wellsite for real-time decision making and/or operation.

The electrodes 302 may couple capacitively through the insulating layer 300 (or insulating surface) then through the fluid 326 (or mud), if present, and into the formation 200. The electrode-formation coupling may be reduced because another capacitor (the insulating layer 300) has been added to the series with the existing mud impedance. The insulating layer 300 may be used to handle rapid and relatively large impedance changes between the electrodes 302 and the formation 200 by preventing the electrodes 302 from touching the formation 200, or where there may be conductive paths through the mud.

The thickness of the insulating layer 300 may be, for example, between about 0.25 mm and 5.00 mm. Further, the thickness of the insulating layer 300 may be, for example, between about 1.00 mm and 2.50 mm Thinner insulating layer 300 may be used, for example, to reduce the standoff S. A smaller standoff S may lead to a higher measurement image resolution. A higher measurement signal may be used to generate better signal to noise ratio (where noise includes thermal noise and other spurious signals). A thicker insulating layer 300 may be used to provide a more stable capacitive coupling between the electrodes 302 and the formation 200 and, therefore, a more stable measurement. Furthermore, a thicker insulating layer 300 may be used to increase strength and resist wear over time. A thicker insulating layer 300 may also be used to prevent fracture and loss of sealing capabilities.

The thickness of the insulating layer 300 may vary over certain areas of the sensor pad 116. For example, the thickness range of the insulating layer 300 may be about 1.00 to 2.50 mm in front of the button electrodes 304 and up to an extra 1.00 mm, or between about 1.00 to 3.50 mm, in front of the source electrodes 306. An insulating layer 300 thickness of at least about 2.00 to 3.00 mm may prevent fracturing, breaking and/or wearing off of the insulating layer 300 during downhole operations. The minimum thickness can be a function of the diameter of the electrodes 302. For example, the thickness of the insulating layer 300 in front of an electrode 302 having a relatively large surface area on the face of the sensor pad 116 may be greater than in front of an electrode 302 having a relatively small surface area on the face of the sensor pad 116. The changing of the insulating layer 300 thickness may prevent premature fracturing, breaking and/or wearing of the insulating layer 300.

For high-frequency microresistivity imaging, the insulating layer 300 thickness in front of the guard electrodes 400 and button electrodes 304 may be important; whereas, the layer thickness in front of the source electrodes 306 may be less significant. However, the insulating layer 300 thickness in front of the source electrodes 306 may be similar to the insulating layer 300 thickness in front of the button electrodes 304 and the guard electrode 400.

Referring now to FIG. 5, the insulating layer 300 comprising a front portion 402, or front face, of the sensor pad 116 may be formed from an insulating material, as discussed above. The front portion 402 may be constructed from insulating material. The insulating layer 300 may be constructed with one or more blind holes 500. The blind holes 500 may be formed for housing a portion, and/or all of the electrodes 302 (such as the source electrode(s) 306, the button electrodes 304 and/or the guard electrodes 400). The electrodes 302 may be mounted in blind holes 500 formed in the sensor pad 116 during assembly. The method of construction of these sensor pads 116 is shown in FIG. 5. The borehole wall faces the front face 402 of the insulating layer 300, which is shown as a complete surface without holes for the electrodes 302.

FIG. 5 shows detail of the construction of the sensor pad 116 having the electrodes 302 and front face 402 of the insulating layer 300. In FIG. 5, the blind holes 500 are formed in the front face 402 of the insulating layer 300. The forming of the blind holes 500 may leave a base section 504 of the insulating layer 300 with the required thickness t. The required thickness may be a thickness that permits electrical communication through the insulating layer 300 and between the electrodes 302 in order to allow measurement of electrical properties. The electrodes 302 may then be inserted into the blind holes 500 so as to seat against the base section 504. The blind holes 500 may be drilled in the front face 402 of the insulating layer 300, or formed by any suitable method such as by molding, cutting, and the like. Each of the blind holes 500 may vary in depth d depending on the required thickness t of the insulating layer 300 in front of the respective electrodes 302.

The blind holes 500 may house any of the electrodes 302 behind the front face 402 of the insulating layer 300. Thus, the blind holes 500 may address problems found in the prior art. First, the thin insulating layer 300 may prevent the electrodes 302 from touching the formation layer 200, as shown in FIGS. 3 and 4. Second, conductive bubbles in the fluid 326, or mud, may no longer form low impedance paths between the electrodes 302 and the formation 200. Finally, the mechanical sealing issues associated with holes that extend all the way through the insulating layer 300 may be avoided.

FIG. 6 shows a perspective view of an electrode 302 usable as the guard electrode 400 of FIG. 4. Each of the electrodes 302 extending into the blind holes 500 and contacting the insulating layer 300 may be a solid electrode, as shown in FIG. 5. However, if the electrode 302 is a large electrode, the electrode 302 may be a multi guard electrode broken up into smaller sub-electrodes 600 that contact the insulating layer 300 as shown in FIG. 6. Therefore, each of the electrodes 302 may comprise a series of interconnected spaced sub-electrodes 600 electrically linked together, for example at an anterior portion of the sensor pad 116.

Large, thin insulating layers 300 on large electrode 302 surfaces may be vulnerable to breaking, wearing, tearing and the like. Therefore, it may be useful to break up large electrodes 302 proximate the insulating layer 300 into the sub electrodes 600 which are linked together. The button electrodes 304 may already be relatively small and, therefore, may be less likely to benefit from sub-division. However, the guard electrode 700, as shown in FIG. 7, is often in the form of a metal ring. The guard electrode 700 may be sub-divided into several sub electrodes 600 as shown in FIG. 6.

Figure 9:
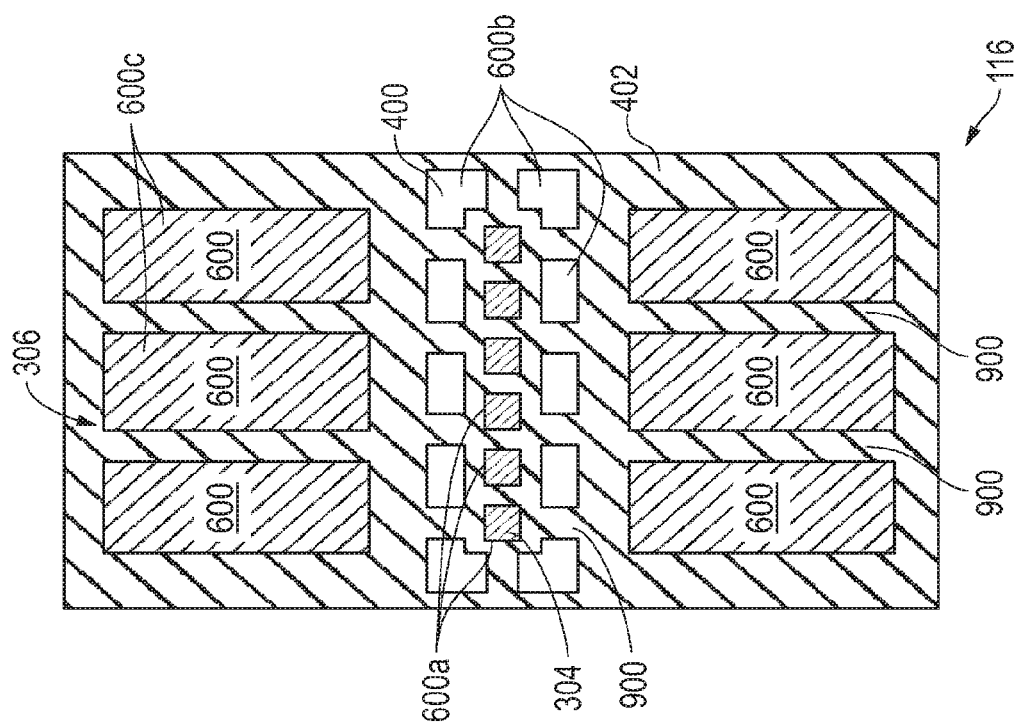
FIG. 9 is a transparent front view of a sensor pad having the multi guard electrode of FIG. 6.
Figure 8:
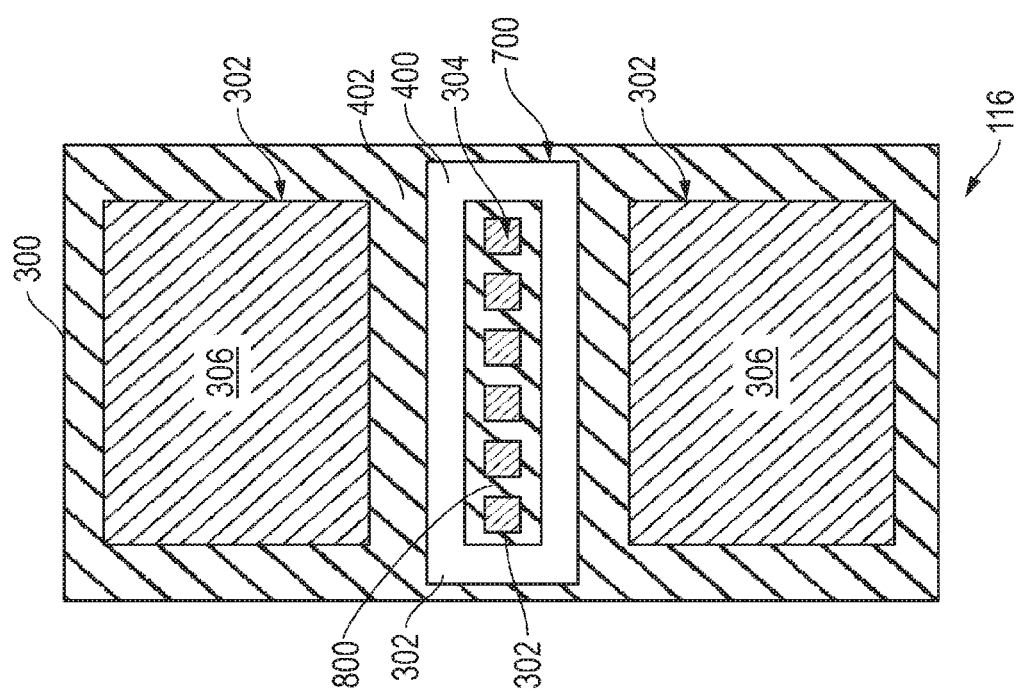
FIG. 8 is a transparent front view of a sensor pad having the ring guard electrode of FIG. 7.

FIGS. 8 and 9 show transparent front views of the sensor pad 116 of FIG. 2A. FIG. 8 shows the sensor pad 116 having two large source electrodes 306, a ring type guard electrode 400, and the button electrodes 304 having sub-electrodes 600a. The front face 402 of the insulating layer 300 used to house the electrodes 302 may have a complementary shape to house the electrodes 302. As shown in FIG. 8, the front face 402 may have one or more ribs 800 which fit in the gaps between sub-electrodes 600a for the button electrodes 304. These ribs 800 may give extra strength to the front face 402 and allow for thinner layers in front of the electrodes 302.

FIG. 8 shows a front face 402 arrangement which is capable of housing the ring guard electrode 700 as shown in FIG. 7. By contrast, FIG. 9 shows a front face 402 arrangement which is capable of housing the series of sub-electrodes 600 of the multi guard electrode 400 of FIG. 6. FIG. 9 shows the sensor pad 116 having the source electrodes 306 subdivided into sub-electrodes 600c, the multi guard electrode 400 being subdivided into sub-electrodes 600a, and the button electrodes 304 having the sub electrodes 600b. The front face 402 of the insulating layer 300 used to house the electrodes 400 may have a complementary shape to house the electrodes 302. As shown in FIG. 9, the front face 402 may have one or more ribs 900 which fit in the gaps between sub electrodes 600a,b,c for the button electrodes 304, the guard electrodes 400 and/or the source electrodes 306. These ribs 900 may give extra strength to the front face 402 and allow for thinner layers in front of the electrodes 302.

FIGS. 8 and 9 show where blind holes 500 for button electrodes 304, blind holes 500 for source electrodes 306 (which can also be sub-divided) and blind holes 500 for the guard electrode 400 have been drilled into the front face 402. The front face 402 may be, for example, less than about 2.00 mm thick where the button electrode 304 and guard electrodes 400 are received and less than about 3.00 mm thick where the source electrodes 306 are received. The region of the front face 402 where no blind holes 500 are present may have an increased thickness, for example, at least about 4.00 mm thick.

Further changes may be made within the scope of the disclosure. In the examples above, the insulating layer 300 may be part of the front face 402. The insulating layer 300 may also be formed by depositing an insulating material such as hard paint, plastic, PEEK™ ceramic and the like over the electrodes 302.

Figure 10:
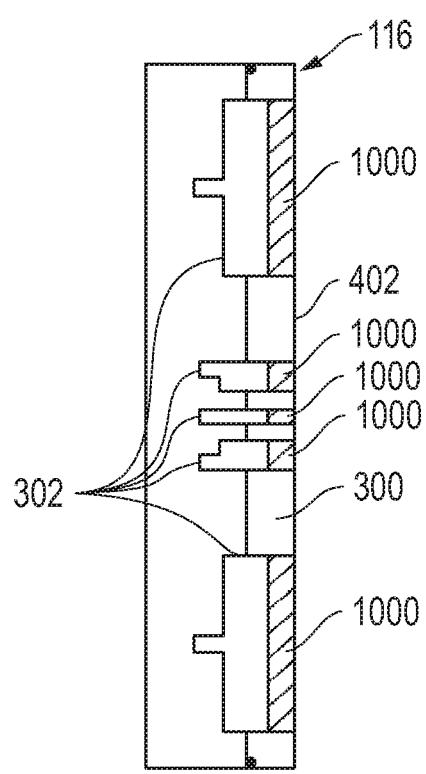
FIG. 10 is a cross-sectional view of another alternate sensor pad.

Alternatively, the insulating layer 300 may be formed having a modified electrode surface property 1000, as shown in FIG. 10. The modified electrode surface property 1000 may allow the electrodes 302 to become the insulating layer 300, or a portion thereof. The modified electrode surface property 1000 may be formed, for example, by anodization. The sub-divided electrodes can also be formed by completely separate but electrically connected sub-electrodes. Further, some of the electrodes 302, may use the modified electrode surface property 1000 while others may be covered by the insulating layer 300 as described above.

FIGS. 11A-16B show various additional versions of a sensor apparatus for measuring formation parameters. The sensor apparatus may comprise a sensor pad 116 having a raised insulating cover 1100-1600, respectively. In each of these Figures, the sensor pad 116 is positioned on the tool pad 308 (or 308'), which is supported by the mandrel 202 (or 202') of the downhole tool 104 (or 104'). The sensor pad 116 may have at least one wear plate 320, the insulating layer 300 or conductive layer 300', and electrodes 302 thereon. The electrodes 302 may include one or more button electrodes 304 positioned along a central portion of the front face 402 of the sensor pad 116 and at least one source electrode 306 or source 306' positioned relative thereto.

The raised insulating cover 1100-1600 may be used to provide a hardened, protective layer over the electrodes 302. The raised insulating cover 1100-1600 may be used to provide an insulating coating that allows passage of electrical signals therethrough like, for example, the insulating layer 300. The raised insulating cover 1100-1600 may also be made durable for providing wear protection like, for example, the wear plate 320. A typical purpose of the raised insulating cover 1100 may be to resist permanent or intermittent contact between the electrodes 304, 306, 400 and the rough surface of the formation, surrounded by wellbore fluid.

The raised insulating cover 1100-1600 may extend over various portions of the front face 402 of the sensor pad 116 to provide direct contact with the formation 200. This configuration may be used to place the electrodes closer to the wellbore wall 206 without direct contact therewith. This configuration may also be used to limit the wellbore fluid 326 (or mud layer) between the sensor pad 116 and wellbore wall 206, to provide a constant layer of insulation between the electrodes 302 and the formation 200, and to provide additional protection to the electrodes. In some examples, the raised insulating cover may have a thickness T of between about 0.30 to 3.00 mm.

Figure 11A:
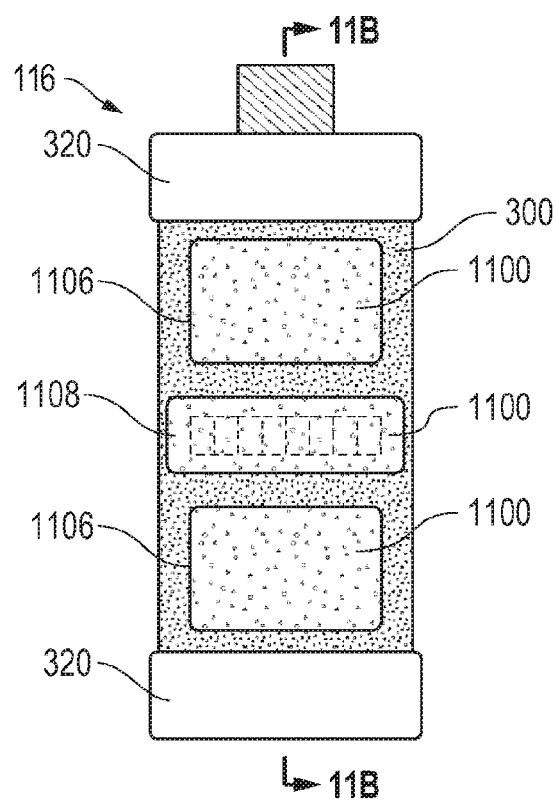
FIGS. 11A and 11B are front and cross-sectional views, respectively, of a portion of a downhole tool depicting a sensor pad with a raised insulating cover.
Figure 11B:
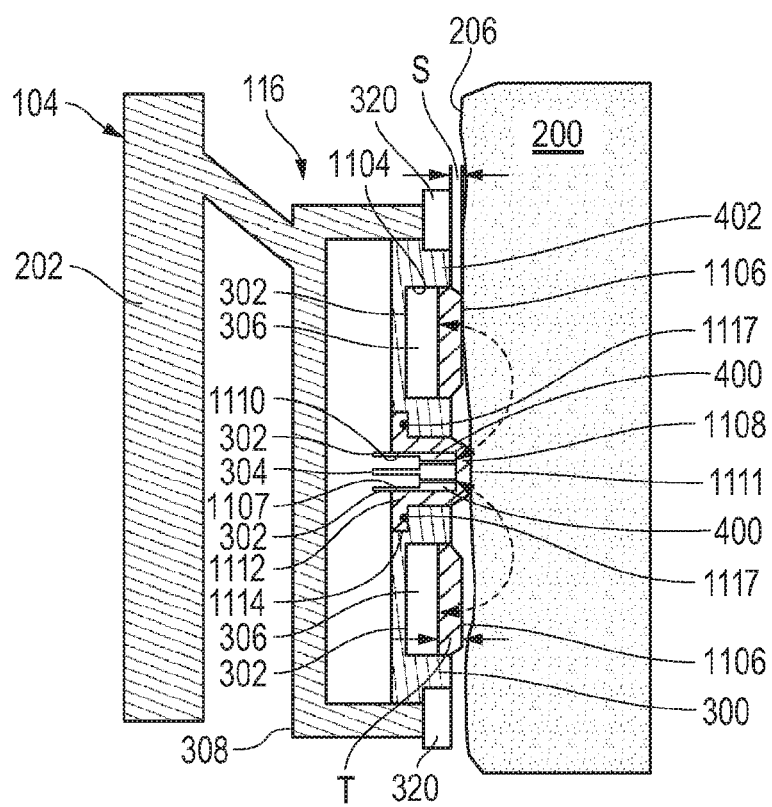

FIG. 11A shows a front view of the pad 116. FIG. 11B shows a cross-sectional view of the sensor pad 116 of FIG. 11A taken along line 11B-11B. The insulating layer 300 may be positioned along the front face 402 of the sensor pad 116 with button electrodes 304 and the source electrodes 306 recessed into the front face 402 thereof. A raised insulating cover 1100 extends over portions of the front face 402. The raised insulating cover 1100 extends a distance beyond the front face 402 for contact with the wellbore wall 206. In this position, the raised insulating cover 1100 provides initial contact with the wellbore wall 206.

As illustrated in FIGS. 11B, 12B, 13B, 14B, 15B, 16A and 16B, standoff S provides a gap between the electrodes 302 and the wellbore wall 206 to prevent direct contact therewith. The wear plates 320 may also have the same standoff S with the wellbore wall 206.

The raised insulating cover 1100 may extend over various portions of the front face 402 and the electrodes 302 for providing protection thereto. In this version, the raised insulating cover 1100 extends over an outer face of the source electrode 306 to form a front cover thereon. The source electrodes 306 are positioned in an electrode cavity 1104 extending into the front face 402 of the insulating layer 300, and recessed a distance therein. A source electrode portion 1106 of the raised insulating cover 1100 is positioned in electrode cavity 1104 and extends over an outer surface of the source electrodes 306. The source electrode portion 1106 may seal and protect the source electrode 306 within the insulating layer 300. The source electrode portion 1106 may protrude a distance beyond the insulating layer 300 to provide initial contact with the wellbore wall 206 while protecting the source electrode 306.

The source electrode portion 1106 has a flat body with a tapered perimeter extending thereabout. The source electrode portion 1106 of FIG. 11A has a rectangular dimension to cover and conform to the shape of the underlying rectangular source electrode 306, but may be of any dimension sufficient to protect and seal the source electrode 306. The source electrode portion 1106 may be tapered, flat, rounded, concave, convex or any other shape. The outer surface of the source electrode portion may be defined to conform to the wellbore wall 206, or to facilitate passage through the wellbore. Tapering along the raised insulating cover 1100 may be used, for example, to prevent the raised insulating cover 1100 from breaking off and/or damaging the sensor pad 116 as the tool 104 passes along rough surfaces along the wellbore wall 206.

The raised insulating cover 1100 extends over an outer face and a sidewall of the button electrode 304 to form a front and side cover thereabout. The button electrodes 304 are positioned in an electrode hole 1107 extending through the front face 402 of the insulating layer 300. A button electrode portion 1108 of the raised insulating cover 1100 is positioned over the electrode hole 1107 and extends over the outer face and sidewall of the button electrodes 304. The button electrode portion 1108 may seal and protect the button electrode 304 within the insulating layer 300 and therefore seal and protect the interior of the pad 116. The button electrode portion 1108 preferably protrudes a distance from the insulating layer 300 to provide initial contact with the wellbore wall 206 while protecting the button electrode 304. The open space between the insulating layer 300 and the tool pad 308 may be filled with liquid and/or other components such as electronic parts e.g. integrated circuits, capacitors, resistors etc. and/or mechanical parts e.g. screws, washers, plastic sheets, etcetera. At least one of the electrodes 302 may be attached to the raised insulating cover. At least one of the electrodes 302 may be attached to a supporting part positioned in the open space between the insulating layer 300 and the tool pad 308.

The button electrode portion 1108 has a cup-shaped body having an inlet 1110 adapted to receive the button electrode 304. The button electrode portion 1108 of FIG. 11B has a tapered outer surface on an outer end 1111, and a lip 1112 extending about a perimeter of an opposite end thereof. The lip 1112 is positioned in a shoulder 1114 of the insulating layer 300 to secure the button electrode portion 1108 therein. The button electrode portion 1108 may be of any dimension sufficient to protect and seal one or more button electrodes 304 (and/or guard electrodes 400). The button electrode portion 1108 may be tapered, flat, concave, convex or any other shape. The outer surface of the button electrode portion may be defined to conform to the wellbore wall 206, or to facilitated passage through the wellbore.

The raised insulating cover 1100 may extend over portions of the front face 402 and/or electrodes 302 in a modular configuration as shown in FIGS. 11A and 11B, or the entire face in a unitary configuration as will be described with respect to FIGS. 14A and 14B below. The raised insulating cover 1100 may also extend a distance into the insulating layer 300 to provide additional protection and/or to be secured by the insulating layer 300 in position. The raised insulating cover 1100 may take a variety of shapes to conform to the electrodes 304, 306, 400. The raised insulating cover 1100 may also take a variety of shapes to position the sensor pad 116 relative to the wellbore wall 206.

The raised insulating cover 1100 may comprise, for example, a hardened material that permits the passage of electrical signals therethrough while providing sufficient hardness to protect the electrodes 302 in a downhole environment. The material may be constituted, for example, from mineral material or technical ceramic (e.g., diamond, zircon, alumina, and the like), or out of an insulating composite material (e.g., glass or ceramic fiber plastics). The choice of material may depend on the hardness, the abrasion resistance, the resilience, the dielectric constant, the chemical resistance or other material properties.

The raised insulating cover 1100 may be made up of (at least in part), for example, the same material as the insulating layer 300. The raised insulating cover 1100 may also be attached to the insulating layer 300 to form a continuous and sealed layer. The attachment between the insulating layer 300 and the raised insulating cover 1100 may be conventional means, such as fastener (e.g., screws or bolts), elastomeric or thermoplastic over-molding, gluing, welding, brazing, etc. Seals 1117 may optionally be provided to ensure pressure tightness between components.

The raised insulating cover 1100 may be made of one or more different materials. For example, the button electrode portion 1108 as shown in FIG. 11B may have lip 1112 of a material, such as metal, that is different from the remainder of the raised insulating cover 1100. A different material like a metal may provide an easier way of attachment between the button electrode portion 1108 and the insulating layer 300. The lip or sidewall may therefore be brazed, welded, glued, overmolded, or otherwise secured to the insulating material portion of the raised insulating cover 1100 at end 1111 facing the wellbore wall. In another example, a metallic or conductive material may be used for the portions of the button electrode portion 1108, such as the lips 1102 and a portion of the sidewall adjacent thereto, to add the function of guarding the button electrode 304. The raised insulating cover 1100 may optionally be provided with various conductive portions, for example, for attachment and sealing with insulating layer 300.

The electrodes 302 (e.g., the button electrodes 304, the source electrode 306, the guard electrode 400 as described herein) may be, for example, a metallization on the insulating layer 300 and/or raised insulating cover 1100. This metallization may be done on or along an insulator, such as a single or multi-layered electronic board, on or along the insulating layer 300 or on the back face of the raised insulating cover 1100. When using metallization, the raised insulating cover 1100 (in any configuration) may be positioned on a back face of the cavity 1104 or a surface of the insulating layer 300 for enabling positioning of the metallization electrode 302 on or along the insulating layer 300 and/or raised insulating cover 1100.

For raised insulating covers 1100 with a flat body configuration (e.g., 1106 of FIG. 11B), the electrodes 302 may be attached to the raised insulating cover 1100 and the insulting layer 300 through insulating material deposition, such as projection coating, bath coating, paint coating, etc.

The raised insulating cover 1100 may fully or partially cover an arrangement of various electrodes 302. The raised insulating cover 1100 may have one or more portions, such as the source electrode portion 1106, the button electrode portion 1108 and/or other portions. In some cases, one or more types of electrodes may be covered by the various portions. For example, the button electrode portion 1108 may also cover one or more guard electrodes 400 positioned adjacent to the button electrode 304.

Figure 12A:
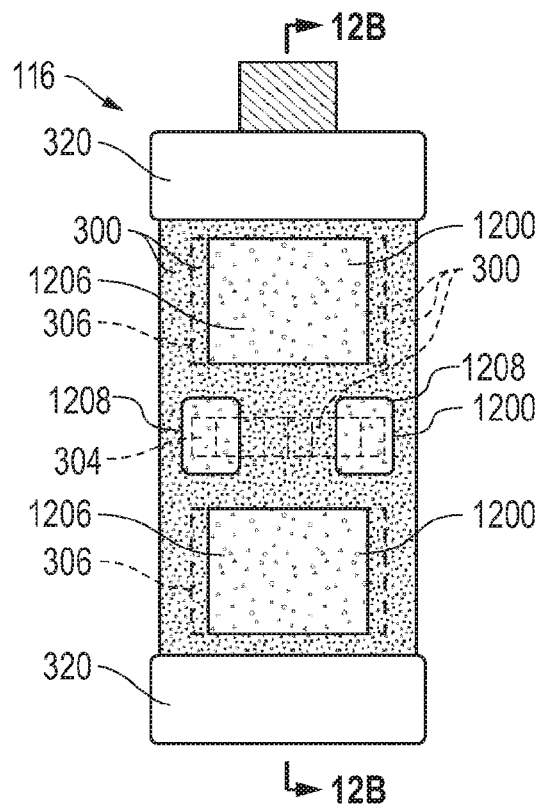
FIGS. 12A and 12B are front and cross-sectional views, respectively, of a portion of a downhole tool depicting an alternate sensor pad and raised insulating cover.
Figure 12B:
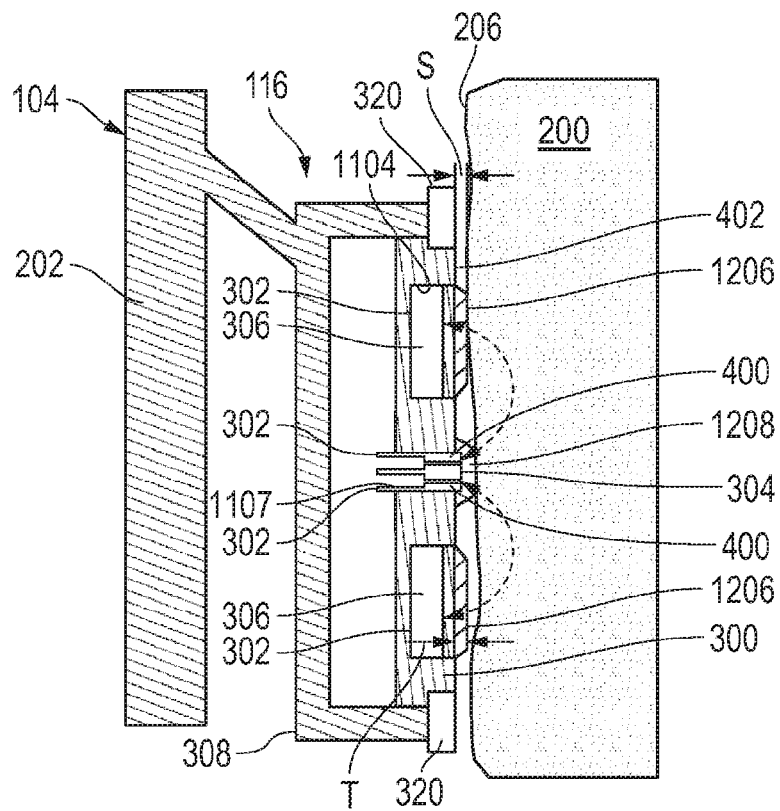

FIGS. 12A and 12B show a variation of the sensor pad 116 of FIGS. 11A and 11B with a raised insulating cover 1200. The raised insulating cover 1200 is similar to the raised insulation cover 1100, except that the raised insulating cover 1200 covers only a portion of the electrodes 302. As shown in this configuration, the raised insulating cover 1200 may extend over part or all of the electrodes 304, 306, 400 and/or the insulating layer 300.

The insulating layer 300 of FIGS. 12A and 12B covers a portion of the front face 402 of the sensor pad 116, including the electrodes 304, 306, 400. The raised insulating cover 1200 is positioned on the insulating layer 300 over the electrodes 304, 306, 400. As also shown by this configuration, the raised insulting cover 1200 may be layered over the electrodes and the insulating layer 300 or other materials. The raised insulating cover 1200 and insulating layer 300 may be configured with materials to provide the desired capacitive coupling therethrough, while achieving the desired protection and/or wear resistance.

The source electrode portion 1206 of the raised insulating cover 1200 extends over a portion of the source electrode 306. As shown, the source electrode portion 1206 covers a central portion of the source electrodes 306, but leaves outer portions uncovered. These outer portions may be covered by the insulating layer 300.

Button electrode portions 1208 of the raised insulating cover 1200 extends over a portion of the button electrodes 304. The button electrode portions 1208 may cover only portions of the sensor pad 116 that are needed to provide the standoff S and/or to protect the button electrodes 304. As shown, two button electrode portion 1206 cover outer portions of the button electrodes 304, but leaves central portions uncovered. These central portions may be covered by the insulating layer 300.

While specific configurations of the raised insulating cover 1200 are shown positioned over the insulating layer 300 and portions of the electrodes 304, 306, 400, various shapes of the raised insulating cover 1200 may be positioned over various portions of the insulating layer 300 and/or one or more electrodes 304, 306, 400. The raised insulating cover 1200 may also extend over the wear plates 320.

Figure 13A:
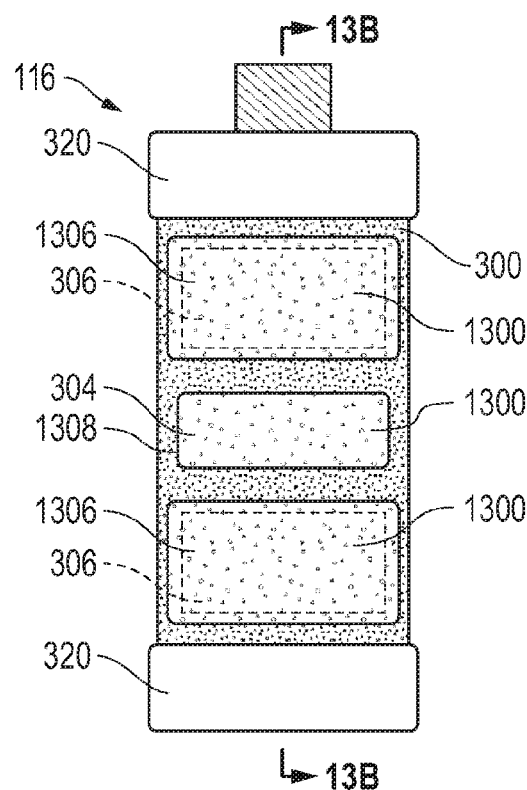
FIGS. 13A and 13B are front and cross-sectional views, respectively, of a portion of a downhole tool depicting another alternate sensor pad and raised insulating cover.
Figure 13B:
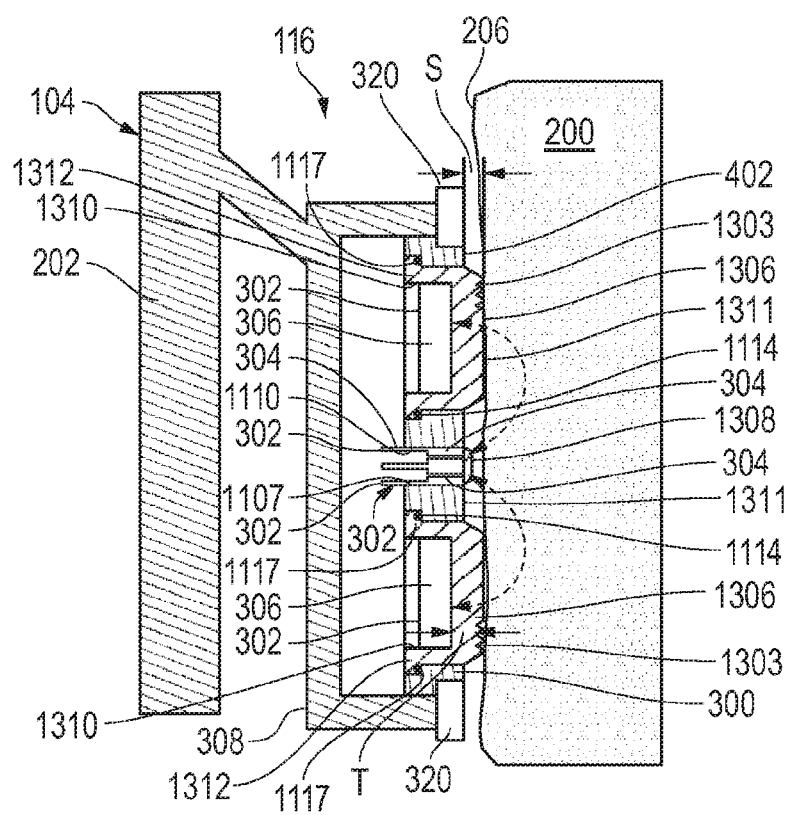

FIGS. 13A and 13B show another variation of the sensor pad 116 and raised insulating cover 1100 of FIGS. 11A and 11B with a raised insulating cover 1300. The raised insulating cover 1300 is similar to the raised insulation cover 1100, except that the raised insulating cover 1300 covers different portions of the electrodes 302. As demonstrated by these Figures (as well as FIGS. 11A and 11B), portions of the raised insulating cover 1300 may cover front and/or sides of the electrodes 302. As shown in FIG. 13B, the button insulating portion 1308 extends over an outer face of the button electrode 304. Like the configuration of the source insulating portion 1106 of FIG. 11B, the button insulating portion 1308 has a flat body with a tapered outer surface.

As also shown in FIG. 13B, the source insulating portion 1306 extends over outer and side surfaces of the source electrodes 306. Like the configuration of the button insulating portion 1108 of FIG. 11B, the source insulating portion 1306 has a cup-shaped body with an inlet 1310 adapted to receive the source electrode 306, a tapered outer surface on an outer end 1311, and a lip 1312 positioned in a shoulder 1114 of the insulating layer 300 to secure the source electrode portion 1306 therein. Seals 1117 may be provided between the raised outer cover 1300 and the insulating layer 300 as shown.

As also demonstrated by FIGS. 13A and 13B, the raised insulating cover 1300 may be provided with additional features, such as a mud scraper 1303. The mud scraper 1303 may be a plurality of teeth positioned on an outer surface of the raised insulating cover 1300. The mud scraper 1303 may be used to scrape against the wellbore wall 206 to remove or displace the layer of mud or mud cake that may be present adjacent to the surface of the formation 200.

Figure 14A:
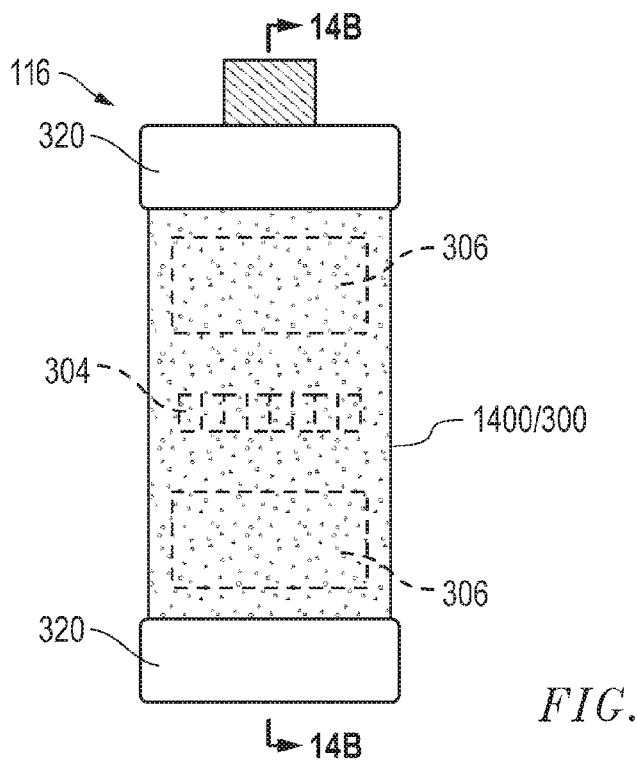
FIGS. 14A and 14B are front and cross-sectional views, respectively, of a portion of a downhole tool depicting another alternate sensor pad and raised insulating cover.
Figure 14B:
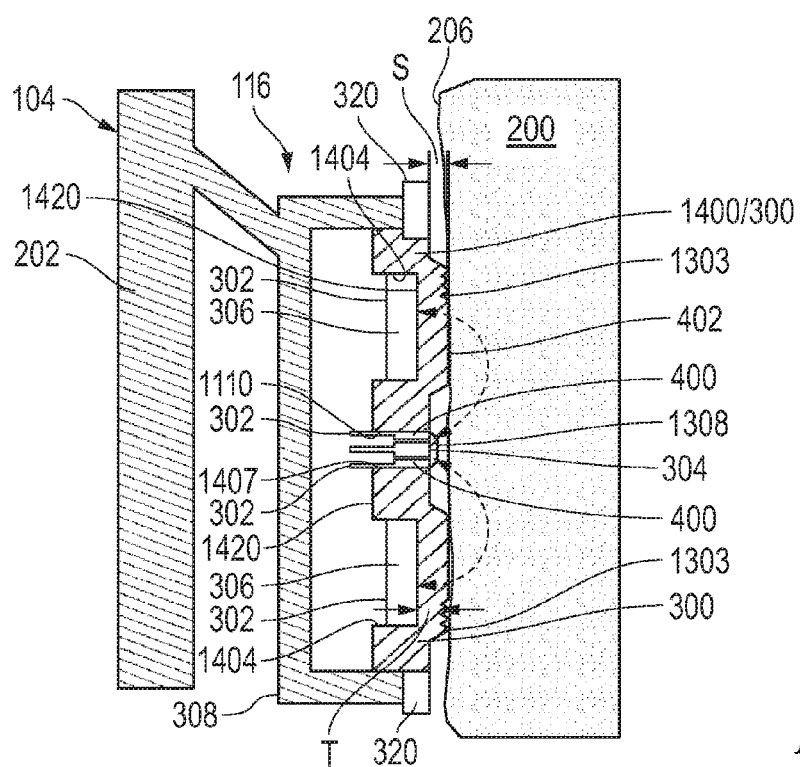

FIGS. 14A and 14B show another variation of the sensor pad 116 and raised insulating cover 1100 of FIGS. 11A and 11B, with a unitary raised insulating cover 1400. The raised insulating cover 1400 is similar to the raised insulation cover 1100, except that the raised insulating cover 1400 covers the entire front face 402 of the sensor pad 116.

As demonstrated by these Figures the raised insulating cover 1400 and the insulating layer 300 may be combined into a unitary structure. In this case, the insulating cover 1400 and insulating layer 300 both extend over the front face 402 of the sensor pad 116. The electrode cavities 1404 extend into an inner surface 1420 of the raised insulating cover 1400 for receiving the source electrodes 306. A hole 1407 also extends into the inner surface 1420 of the raised insulating cover 1400 for receiving the button electrodes 304, but is terminated by the raised insulating cover 1400 which covers an end thereof.

In the configuration of FIGS. 14A and 14B, the raised insulating cover 1400 may be a single entity constructed of a single material. The electrodes 304, 306, 400 may be inserted into the unitary structure. Alternatively, the raised insulating cover 1400 may be made of multiple components of the same material and integrated to form a unitary structure. The insulating layer 300 may be incorporated into the raised insulating cover 1400, or used in conjunction therewith.

Figure 15A:
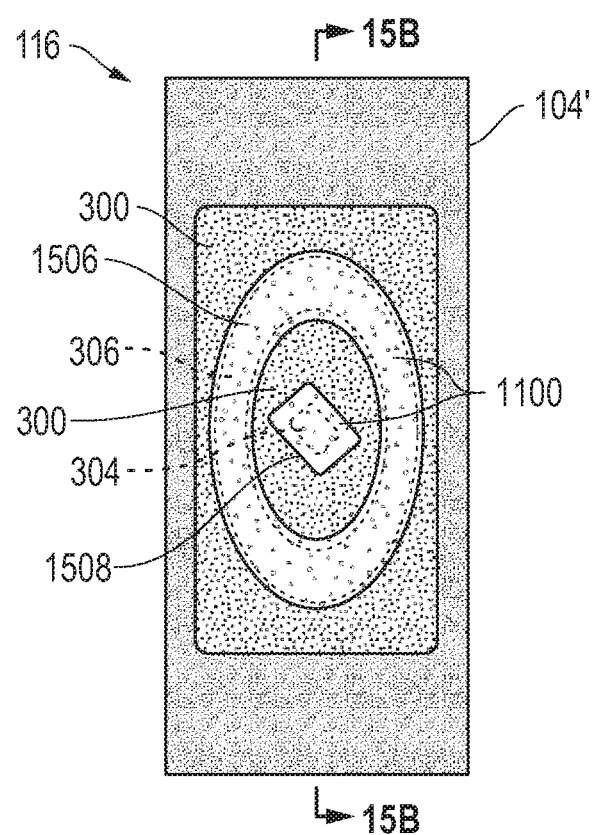
FIGS. 15A and 15B are front and cross-sectional views, respectively, of a portion of a downhole tool depicting another alternate sensor pad and raised insulating cover.
Figure 15B:
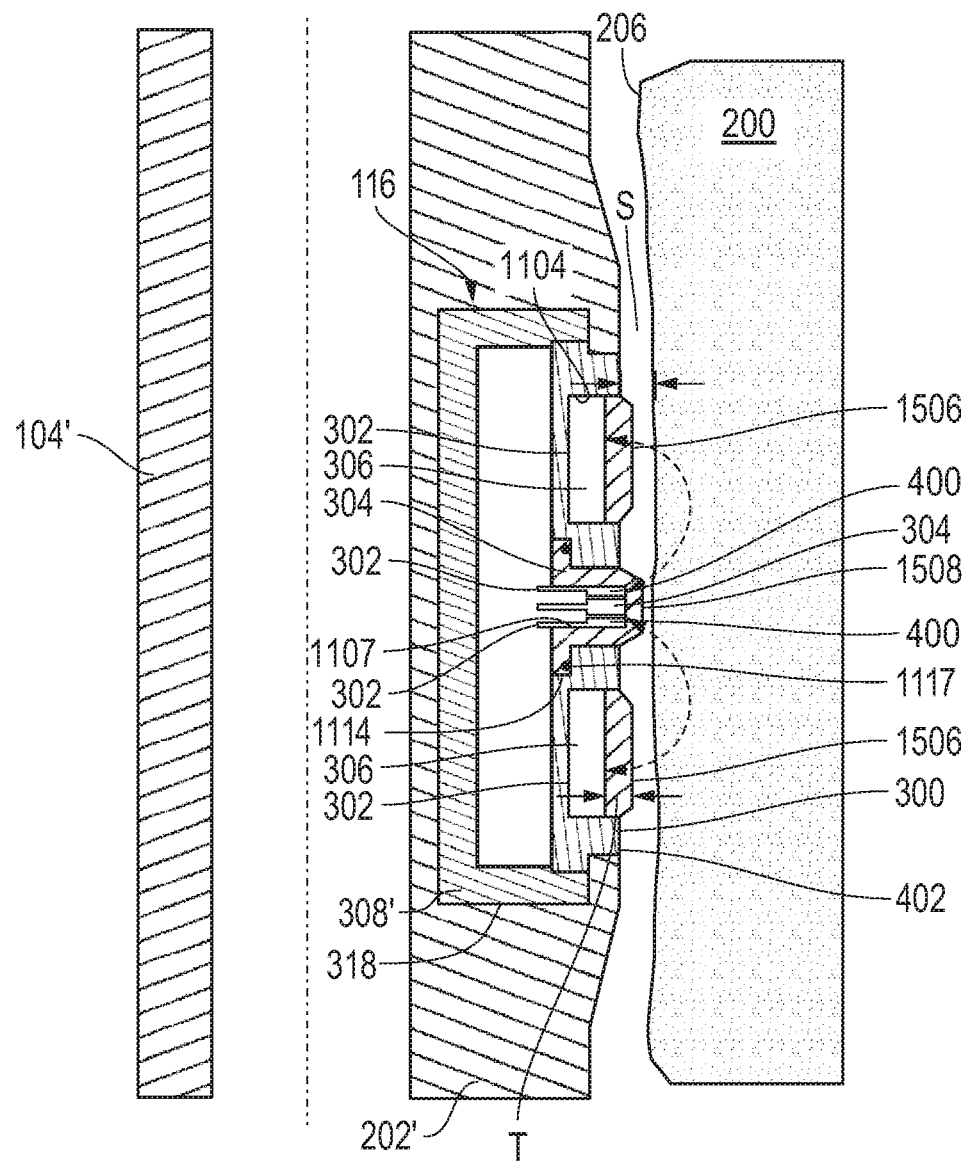

FIGS. 15A and 15B show another variation of the sensor pad 116 and raised insulating cover 1500 positioned on a downhole drilling tool 104'. As demonstrated by these Figures the sensor pad 116 may be used in combination with any downhole tool, such as the downhole drilling tool 104' as depicted. The sensor pad 116 is shown positioned on a tool base 308' within a mandrel 202' of the downhole drilling tool 104'. The sensor pad 116 also has an insulating layer 300 for supporting source electrodes 306 and button electrodes 304. In addition the sensor pad 116 may also have at least one guard electrode.

The raised insulating cover 1500 is similar to the raised insulating cover 1100, except that the raised insulating cover 1500 has concentric source and button electrode portions 1406,1408. As further demonstrated by this configuration, one or more electrodes 302 may be in any configuration about the sensor pad 116. In this version, the source electrode 306 has an oval shape on a front face 402 of the sensor pad 116. A source electrode portion 1506 of the raised insulating cover 1500 extends over the source electrode 306. The source electrode portion 1506 is depicted as a cover over an outer surface of the source electrodes 306 similar to the cover configuration of the source electrode portion 1106 of FIG. 11B.

The button electrodes 304 are positioned within an inner perimeter of the source electrode 306 at any angle to an axis of the downhole tool 104'. The button electrode portion 1508 of the raised insulating cover 1500 extends over the button electrode 304. The button electrode portion 1508 is depicted as covering front and side portions of the button electrodes 304 (similar to the configuration of the button electrode portion 1108 of FIG. 11B).

Figure 16A:
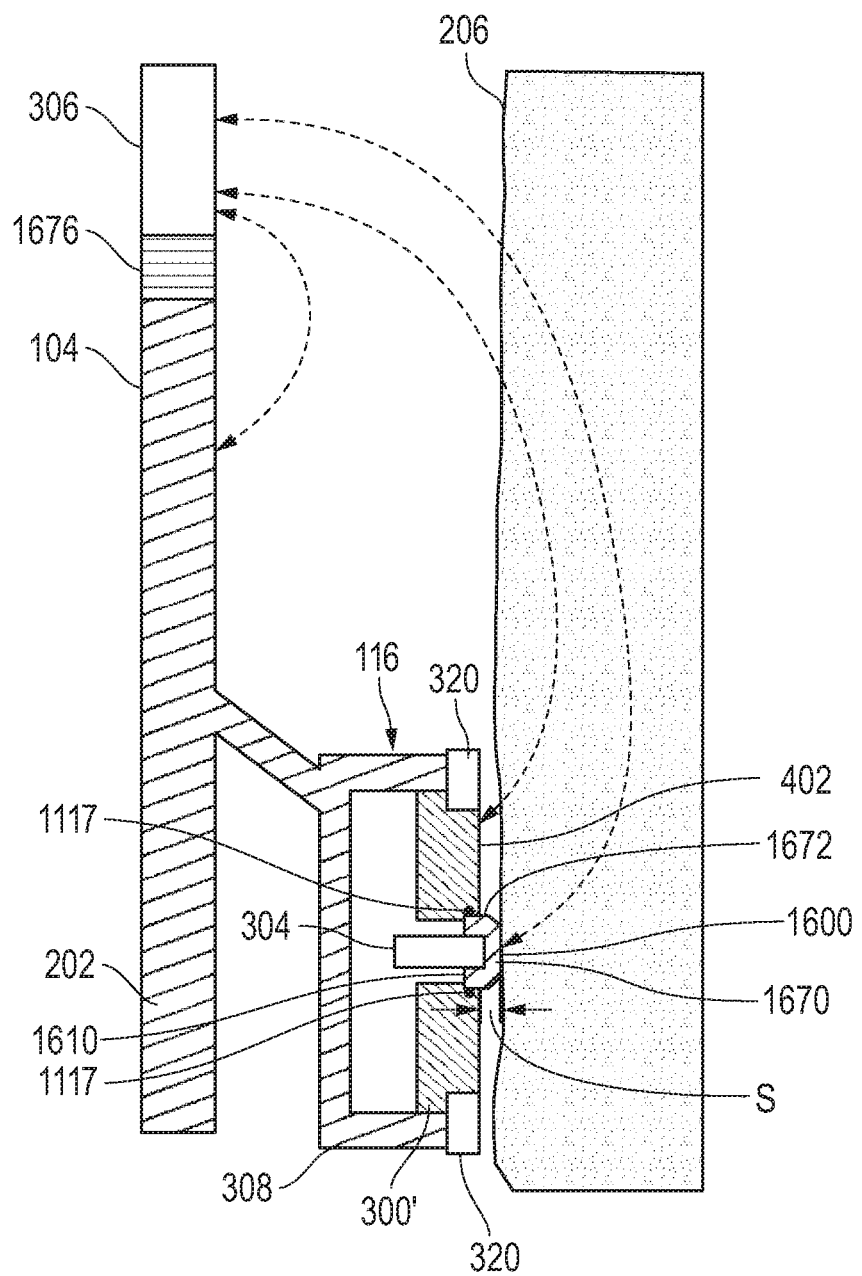
FIGS. 16A and 16B are cross-sectional views of a portion of a wireline downhole tool and a drilling downhole tool, respectively, each depicting another alternate sensor pad with a raised insulating cover.
Figure 16B:
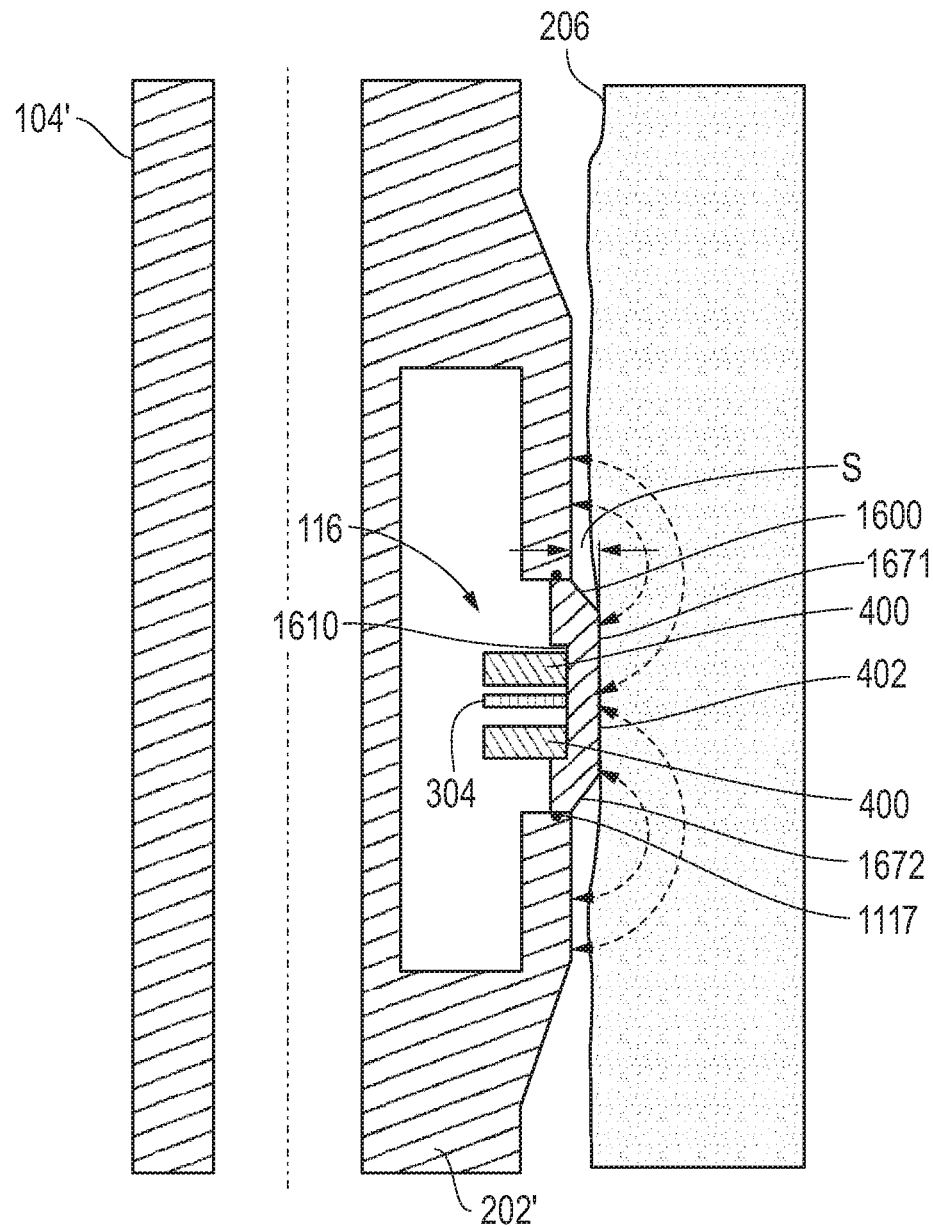

FIGS. 16A-16B show various configurations of a downhole tool 104 with a sensor pad 116 and a conductive mandrel 202. In the version depicted in FIG. 16A, the downhole tool is a wireline tool 104 with a sensor pad 116 positioned on a tool pad 308 extending towards a wellbore wall 206. Wear plates 302 are also provided for additional protection of the sensor pad 116.

The sensor pad 116 has an electrode 304 positioned in a conductive layer 300', and a raised insulating cover 1600 positioned thereon. The electrode 304 is positioned in a hole 1610 in the conductive layer 300'. The electrode 304 is supported by the raised insulating cover 1600 in non-contact with the conductive layer 300'.

The raised insulating cover 1600 is in a semi-module configuration positioned along the front face 402 and over the hole 1610. The raised insulating cover 1600 has an end 1670 and a sidewall 1672 extending therefrom. The end 1670 covers an end of the electrode 304, and the sidewall 1672 extends over a portion of a sidewall of the electrode 304. The raised insulating cover 1600 may be sealed or connected to the conductive layer 300'. The raised insulating cover 1600 defines a standoff S between the front face 402 and the flat end 1670. Seals 1117 are positioned between the raised insulating cover 1600 and the conductive layer 300'. Insulation, such as insulating layer 300, may optionally be positioned about the electrode 304.

In this version, the source electrode 306 is positioned in the mandrel 202. An insulator 1676 is positioned between the source electrode and the mandrel 202. The insulator 1676 may be made of the same material as the insulating layer 300 or the raised insulating cover 1600. The insulator 1676 may be positioned about the electrode 306 for isolating the source electrode 306 from metal portions of the downhole tool 104.

The source electrode 306 may be used to pass current through the wellbore and/or formation. As shown, the current may be received by the button electrode 304 for measurement thereof.

In the version depicted in FIG. 16B, the downhole tool is a drilling tool 104' with a sensor pad 116 formed in a metal drilling collar (or mandrel) 202'. In this version the sensor pad 116 is integral with the drilling collar 202', with the drilling collar 202' acting as the base (e.g., 308 of FIG. 11B).

The sensor pad 116 has a button electrode 304 and guard electrodes 400 positioned in a raised insulating cover 1600. The button electrode 304 is positioned in a hole 1110 in the raised insulating cover 1600. The electrodes 304, 400 are supported by the raised insulating cover 1600 in non-contact with the drill collar 202'. Insulation, such as insulating layer 300, may optionally be positioned about the button electrode 304 and guard electrode 400.

The raised insulating cover 1600 is in a front and side cover configuration positioned over along the front face 402 and over the hole 1610. The raised insulating cover 1600 has a tapered end 1671 and a sidewall 1672 extending therefrom. The tapered end 1671 covers an end of the electrode 304 with the sidewall 1672 extending over a portion of a sidewall of the electrode 304. The raised insulating cover 1600 defines a standoff S between the front face 402 and the flat end 1671. Seals 1117 are positioned between the raised insulating cover 1600 and the drill collar 202'. Seals as provided herein may be provided by o-ring or other seals, or by, for example, brazing the raised insulating cover 1600 to the metal conductive layer 300'.

In the version of FIG. 16B, the mandrel 202' acts as source. The button and guard electrodes 304, 400 receive current from the mandrel 202'. The button electrode 304 may then be used to measure the current. While FIG. 16B depicts a version without a source without a source electrode, a source electrode and insulation (similar to those of FIG. 16A) may optionally be provided in the mandrel 202'. The mandrel 202' acts as a source, with portions of the source which are closer to the button and guard electrodes contributing more current than the portions that are farther.

FIGS. 11A-16B show various configurations of a sensor pad 116 with electrodes 304, 306, 400, an insulating layer 300, conductive layer 300' and a raised insulating cover 1100-1600, respectively. It will be appreciated that various combinations of the sensor pad 116 and its components may be used on various downhole tools. For example, a downhole drilling tool 104' may be provided with a sensor pad with the unitary configuration of FIGS. 14A and 14B, a mud scraper 1303 of FIGS. 13A and 13B, and/or other features previously described herein.

Figure 17A:
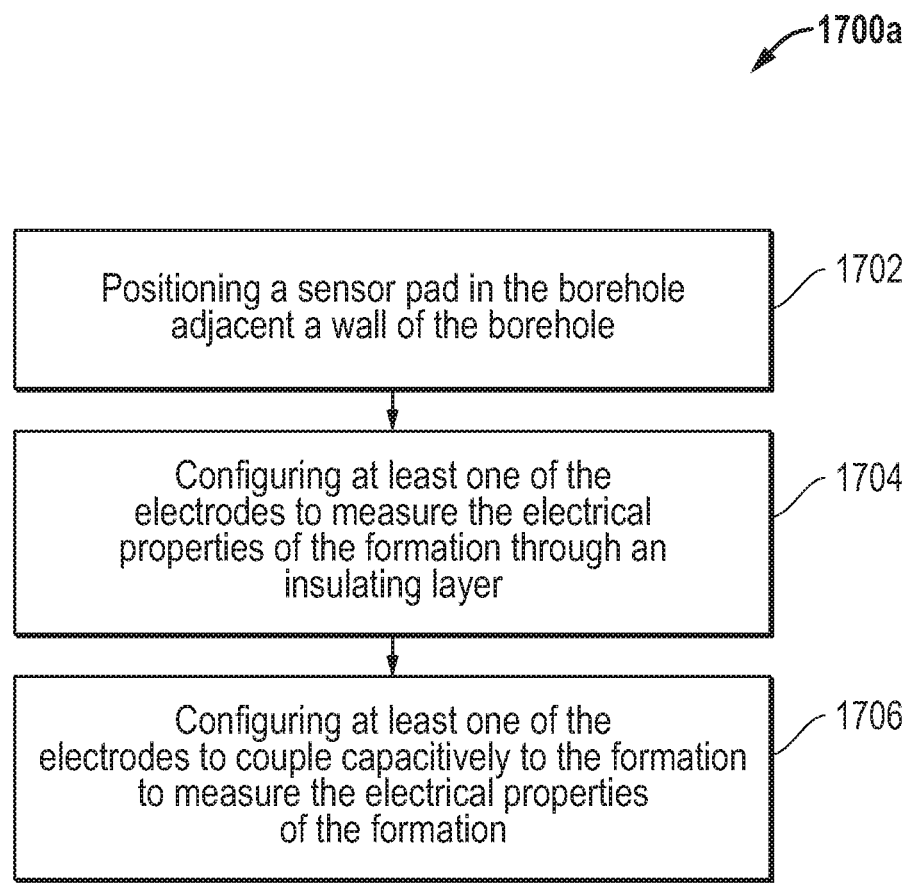
FIGS. 17A and 17B are flowcharts depicting a method of measuring downhole parameters.
Figure 17B:
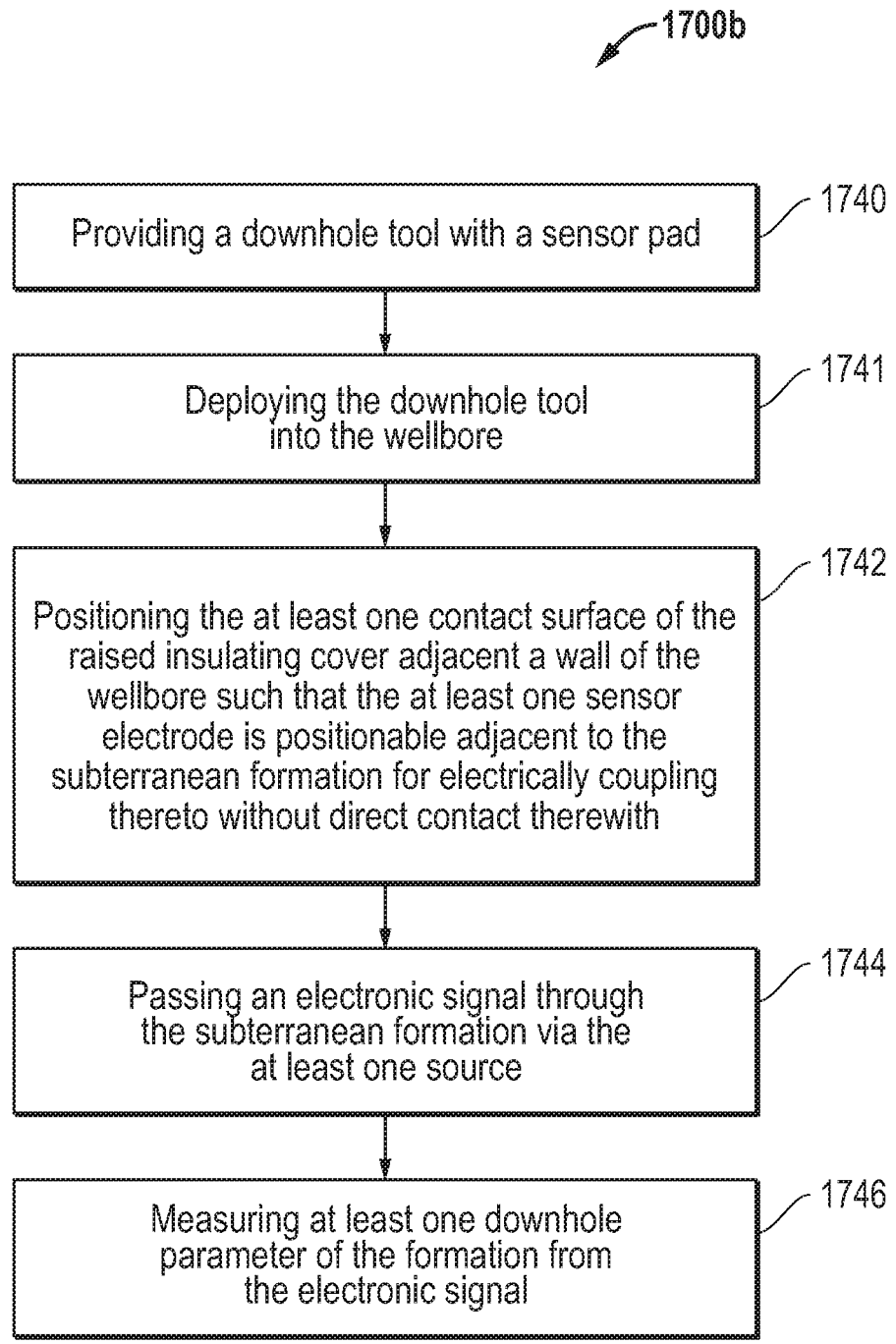

In operation, the sensor pad 116 may be used to gather downhole data. FIGS. 17A and 17B are flowcharts depicting methods (1700*a*, 1700*b*) for measuring downhole parameters. As shown in FIG. 17A, the method (1700*a*) involves positioning (1702) a sensor pad in the borehole adjacent a wall of the borehole. The sensor pad may have an arrangement of electrodes for measuring the electrical properties of the formation mounted on the sensor pad and configured to face the wall of the borehole, and having an insulating layer extending over a substantial portion of at least one electrode facing the wall of the borehole. The flow continues at block (1704) wherein the electrodes may be configured to measure the electrical properties of the formation through the insulating layer. The flow may optionally continue at block (1706) wherein at least one of the electrodes may be configured to couple capacitively to the formation to measure the electrical properties of the formation.

As shown in FIG. 17B, the method (1700*b*) involves providing (1740) a downhole tool with a sensor pad (and/or sensing apparatus), deploying (1741) the downhole tool into the wellbore; positioning (1742) a raised insulating portion of the sensor pad (and/or sensing apparatus) adjacent a wall of the wellbore, passing (1744) an electronic signal from a source (and/or source electrode) through the formation and to the at least one sensor electrode, and measuring (1746) at least one downhole parameter of the formation from the electronic signal. The sensor pad may be positioned with at least one contact surface of the raised insulating cover adjacent the wall of the wellbore such that the electrodes are positionable adjacent to the subterranean formation for electrically coupling thereto without direct contact therewith. The sensor pad (and/or sensing apparatus) may have an arrangement of electrodes for measuring the electrical properties embedded in an insulating layer or conductive layer, and an insulating layer and/or raised insulating cover extending over the electrodes. The steps may be performed in any order, and repeated as desired.

While the embodiments are described with reference to various implementations and exploitations, it will be understood that these embodiments are illustrative and that the scope of the inventive subject matter is not limited to them. Many variations, modifications, additions and improvements are possible. For example, the raised insulating cover and/or insulating cover may be positioned about various portions of the front face of the sensor pad to protect the electrodes.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A system for measuring downhole parameters of a wellsite, the wellsite having a wellbore extending into a subterranean formation, the system comprising:
    a downhole tool;
    at least one source positioned about the downhole tool;
    at least one sensor electrode positioned about a front face of the downhole tool for measuring electrical signals from the at least one source, wherein the front face and the at least one sensor electrode defines a plane at least partially exposed to a wall in the subterranean formation; and
    a raised insulating cover positioned along and protruding from the front face, wherein the raised insulating cover extends over at least a portion of the at least one sensor electrode such that the raised insulating cover is configured to be interposed between the sensor electrode and the wall and that at least one sensor electrode electrically couples to the subterranean formation without direct contact therewith.

2. The system of claim 1, further comprising an insulating layer positioned about the at least one sensor electrode.

3. The system of claim 1, further comprising a conductive layer positioned about the at least one sensor electrode without direct contact therewith.

4. The system of claim 1, wherein the at least one source is a mandrel of the downhole tool.

5. The system of claim 1, wherein the at least one source is a source electrode positioned about the downhole tool.

6. The system of claim 1, wherein the raised insulating cover has a tapered edge.

7. The system of claim 1, wherein the raised insulating cover extends over the source electrode.

8. The system of claim 1, wherein the downhole tool is one of a logging, wireline, drilling, coiled tubing, drill stem tester, production, casing, pipe and completions tool and combinations thereof.

9. The system of claim 1, wherein the raised insulating cover extends over the front face of the downhole tool.

10. The system of claim 1, wherein the raised insulating cover provides a standoff between the wellbore wall and the at least one sensor electrode.

11. The system of claim 1, wherein portions of the raised insulating cover comprise different materials.

12. The system of claim 1, wherein the electrical signals are measured in the presence of a non-conductive wellbore fluid.

13. A method for measuring downhole parameters of a wellsite, the wellsite having a wellbore extending into a subterranean formation, the method comprising:
    deploying the downhole tool into the wellbore, the downhole tool comprising:
        at least one source positioned about the downhole tool;
        at least one sensor electrode positioned in line with a front face of the downhole tool for measuring electrical signals from the at least one source, wherein the front face defines a surface at least partially exposed to a wall in the subterranean formation; and
        a raised insulating cover positioned along and protruding from the front face, the raised insulating cover extending over at least a portion of the at least one sensor electrode such that the raised insulating cover is configured to be interposed between the sensor electrode and the wall and that the at least one sensor electrode electrically couples to the subterranean formation without direct contact therewith;
    positioning at least one contact surface of the raised insulating cover adjacent a wall of the wellbore such that the raised insulating cover is interposed between the sensor electrode and the wall and that at least one sensor electrode electrically couples with the subterranean formation without direct contact therewith;
    passing an electrical signal through the subterranean formation via the at least one source; and measuring at least one downhole parameter of the formation from the electrical signal.

14. The method of claim 13, wherein the step of passing comprises passing the electrical signal from the at least one source to the at least one sensor electrode.

15. The method of claim 13, wherein the step of passing further comprises passing the electrical signal through the raised insulating cover.

* * * * *